(12) United States Patent
Groshert et al.

(10) Patent No.: US 9,343,724 B2
(45) Date of Patent: May 17, 2016

(54) CELL CONNECTOR

(75) Inventors: Jan Groshert, Dettingen (DE); Armin Diez, Lenningen (DE); Wolfgang Fritz, Metzingen (DE); Michael Kohnle, Hülben (DE); Axelle Hauck, Neubiberg (DE); Philipp Petz, München (DE); Hubertus Goesmann, Auernheim (DE)

(73) Assignees: ElringKlinger AG, Dettingen (DE); Bayerische Motoren Werke Aktiengesellschaft, Munich (DE)

( * ) Notice: Subject to any disclaimer, the term of this patent is extended or adjusted under 35 U.S.C. 154(b) by 695 days.

(21) Appl. No.: 13/506,300

(22) Filed: Apr. 10, 2012

(65) Prior Publication Data

US 2012/0276431 A1    Nov. 1, 2012

Related U.S. Application Data

(63) Continuation of application No. PCT/EP2010/053585, filed on Mar. 19, 2010.

(30) Foreign Application Priority Data

Oct. 16, 2009 (DE) .......................... 10 2009 050 316

(51) Int. Cl.
*H01M 2/10* (2006.01)
*H01M 2/20* (2006.01)
*H01M 10/0525* (2010.01)

(52) U.S. Cl.
CPC .......... *H01M 2/206* (2013.01); *H01M 10/0525* (2013.01); *Y10T 29/49117* (2015.01)

(58) Field of Classification Search
CPC ......... H01M 2/206; H01M 2/10; H01M 2/22; H01M 2/202; H01M 10/04; H01M 10/0525; H01M 10/4207; H01M 6/42; H01M 6/50; H01B 5/00
See application file for complete search history.

(56) References Cited

U.S. PATENT DOCUMENTS

| 1,393,674 | A | 10/1921 | Doe |
| 3,537,907 | A | 11/1970 | Wilson .......................... 136/132 |
| 2003/0064285 | A1 | 4/2003 | Kawamura et al. ........... 429/181 |
| 2003/0091896 | A1 | 5/2003 | Watanabe et al. ............. 429/158 |
| 2007/0020513 | A1 | 1/2007 | Medina et al. ................ 429/120 |
| 2008/0090137 | A1 | 4/2008 | Buck et al. .................... 429/120 |
| 2008/0248378 | A1 | 10/2008 | Mcguire ........................ 429/99 |
| 2008/0318122 | A1* | 12/2008 | Sun ............................... 429/156 |
| 2010/0015519 | A1 | 1/2010 | Trester et al. ................. 429/160 |

FOREIGN PATENT DOCUMENTS

| CN | 101136457 A | 3/2008 |
| DE | 10 2006 015 566 | 10/2007 |

(Continued)

*Primary Examiner* — Raymond Alejandro

(57) ABSTRACT

To provide a cell connector for the electrically conductive connection of a first cell terminal of a first electrochemical cell and a second cell terminal of a second electrochemical cell of an electrochemical device, which allows a reliable and fail-safe connection of the cell terminals, it is proposed that the cell connector comprises a first contact section for connection to the first cell terminal, a second contact section for connection to the second cell terminal and an elastically and/or plastically deformable compensation region, which connects the first contact section and the second contact section to one another and allows a movement of these contact sections relative to one another.

6 Claims, 37 Drawing Sheets

(56) References Cited

FOREIGN PATENT DOCUMENTS

| | | |
|---|---|---|
| DE | 20 2009 012 647 U1 | 12/2009 |
| FI | 2 919 117 | 1/2009 |
| WO | WO 2007/071425 | 7/2007 |
| WO | WO 2008/098193 | 8/2008 |
| WO | WO 2009/041735 | 4/2009 |
| WO | WO 2009/082956 | 7/2009 |

* cited by examiner

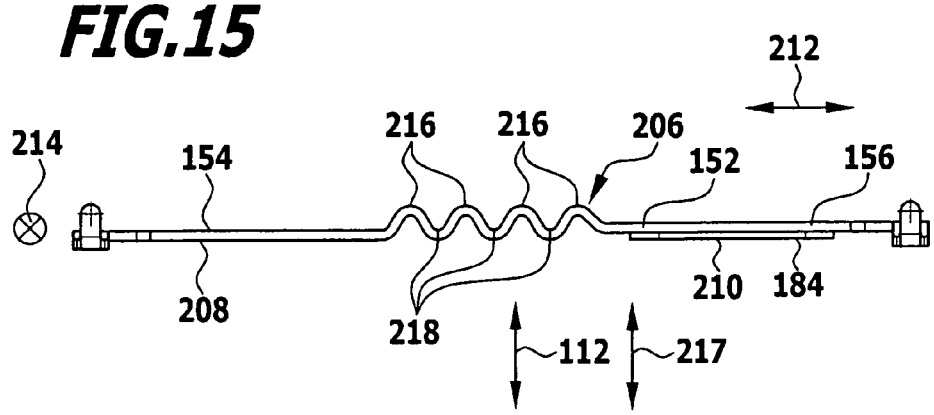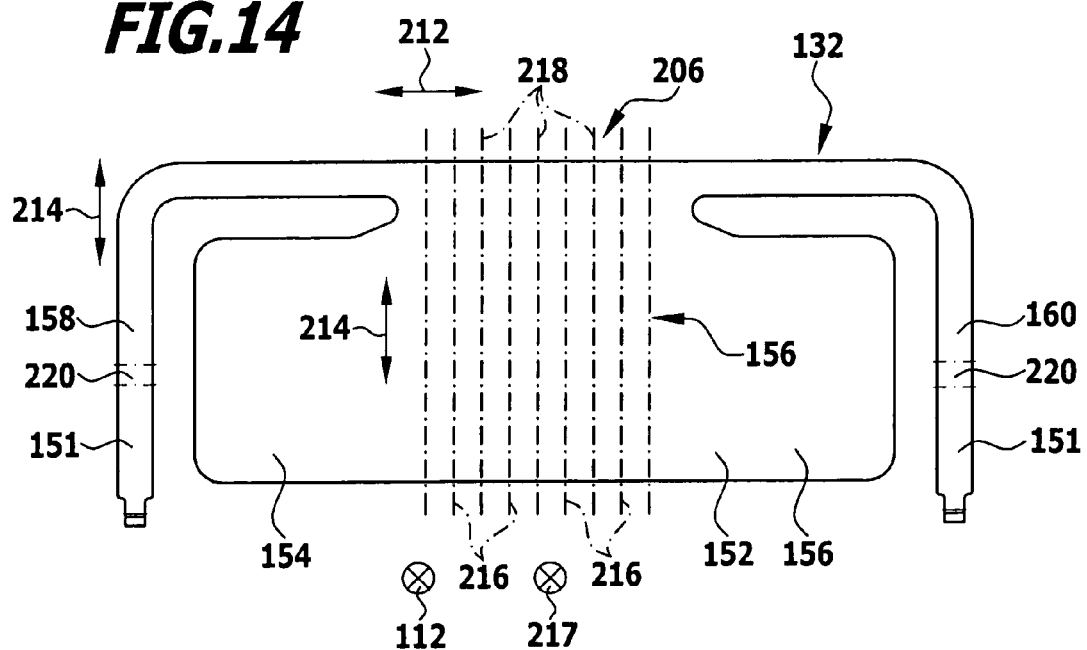

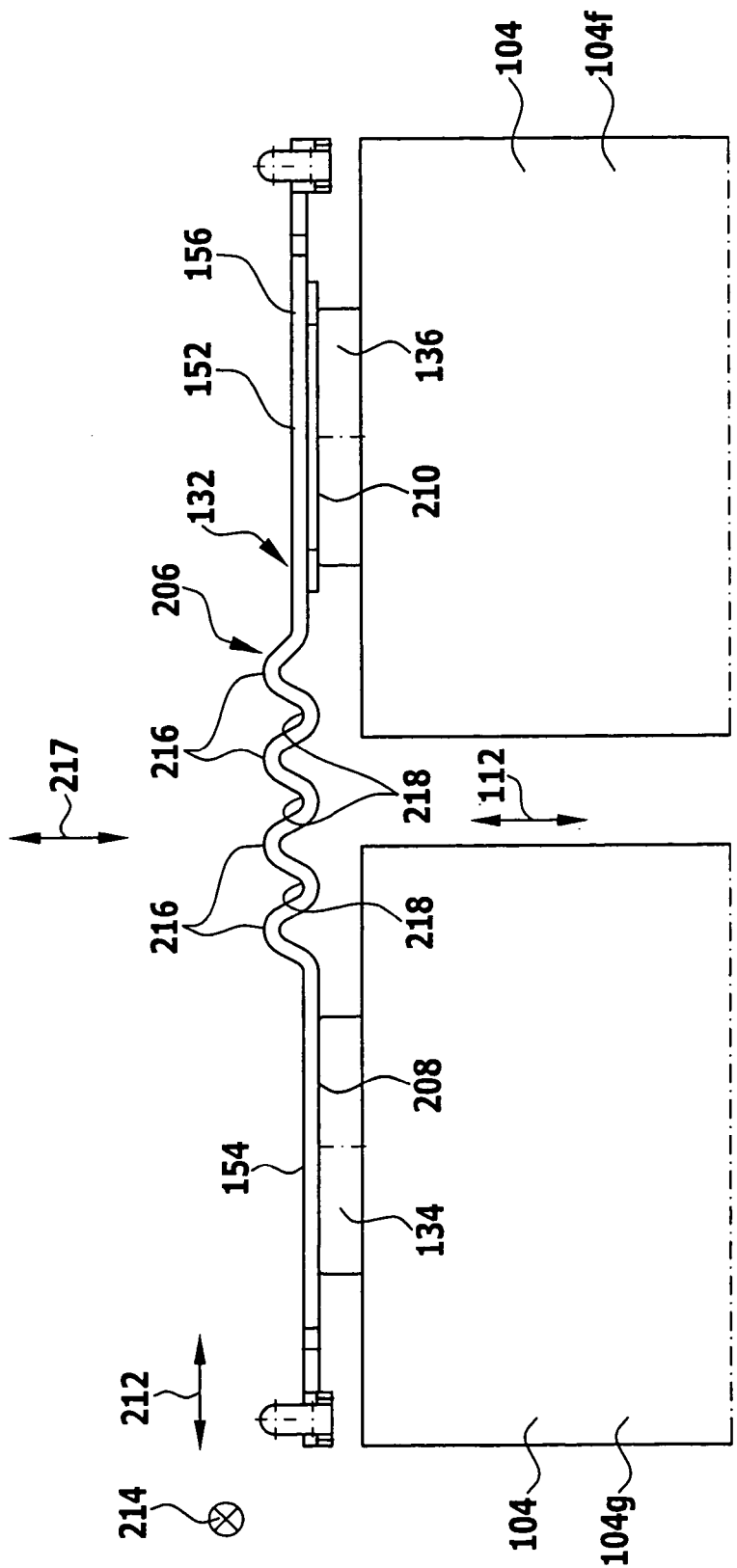

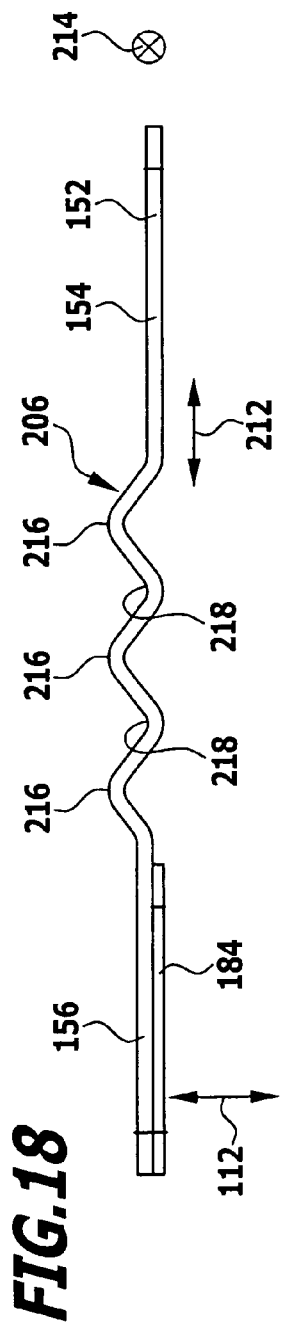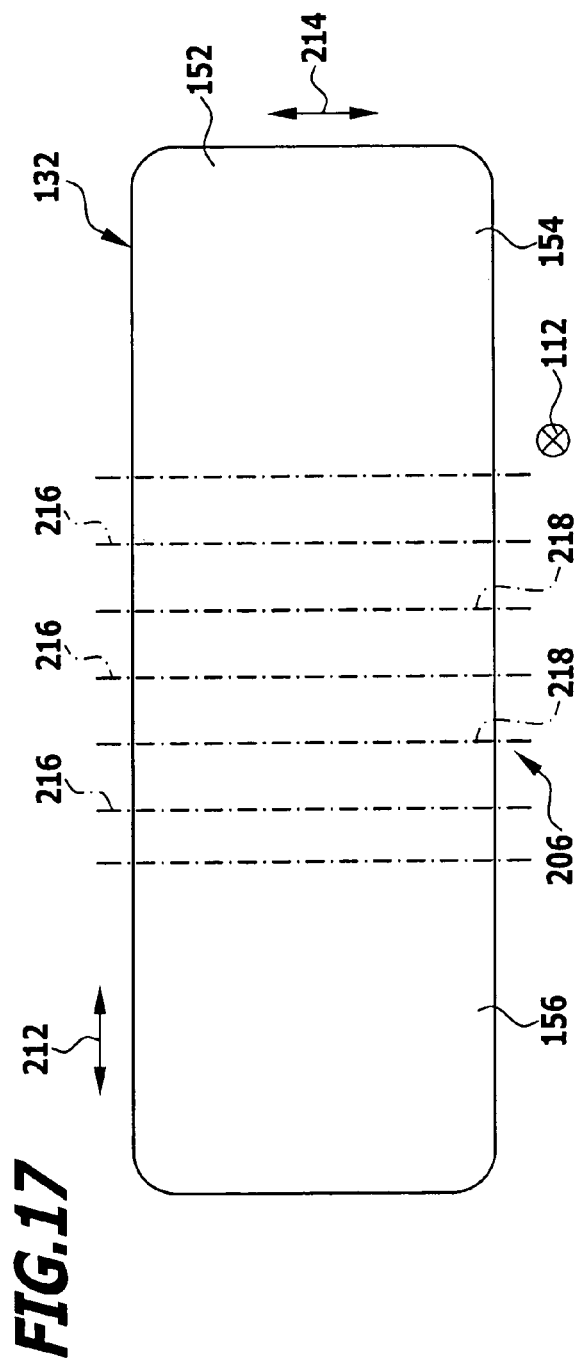

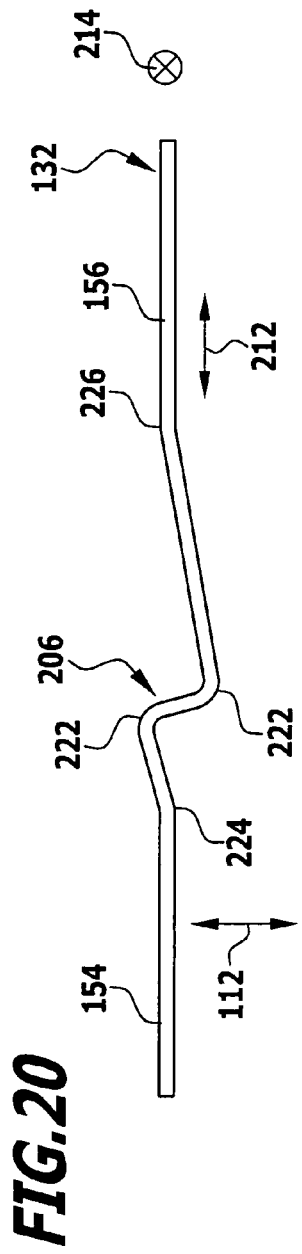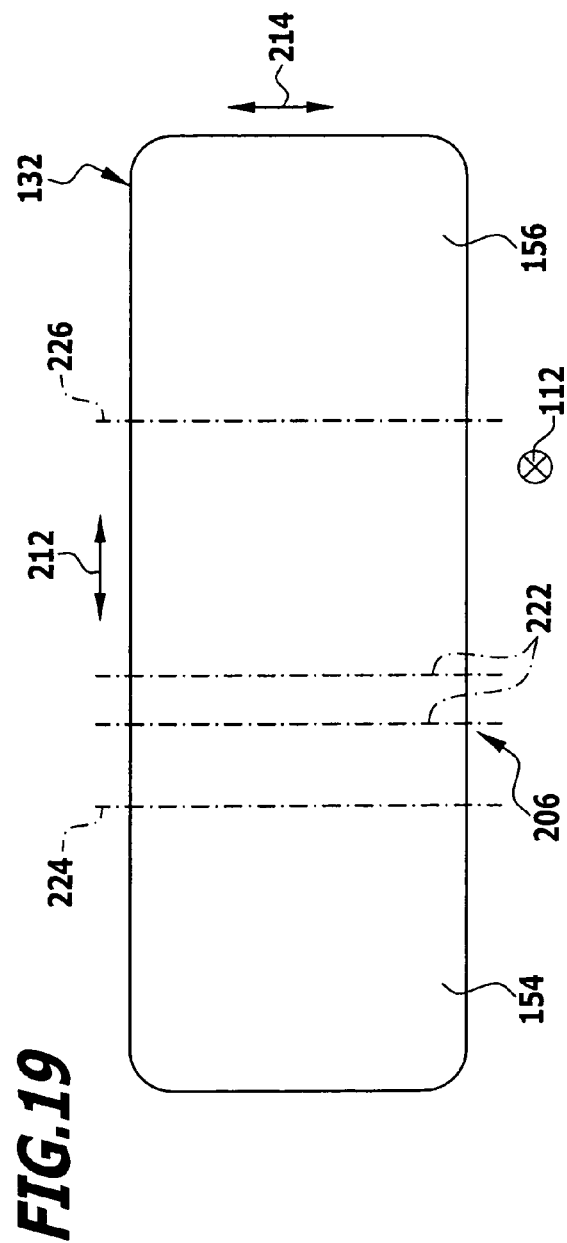

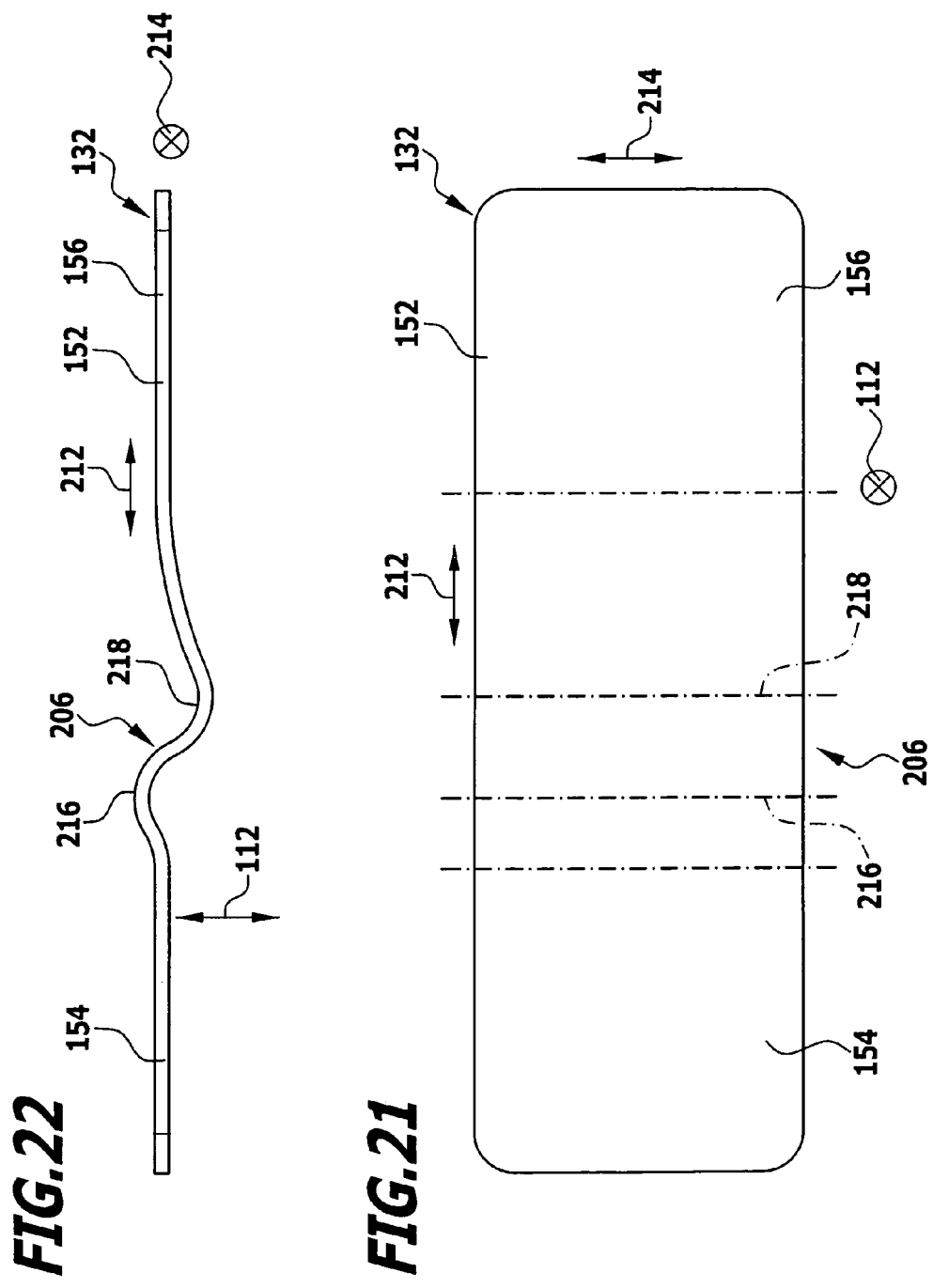

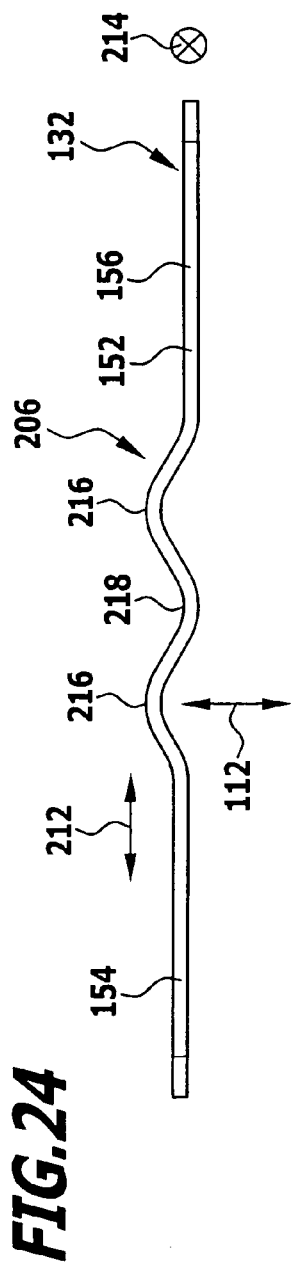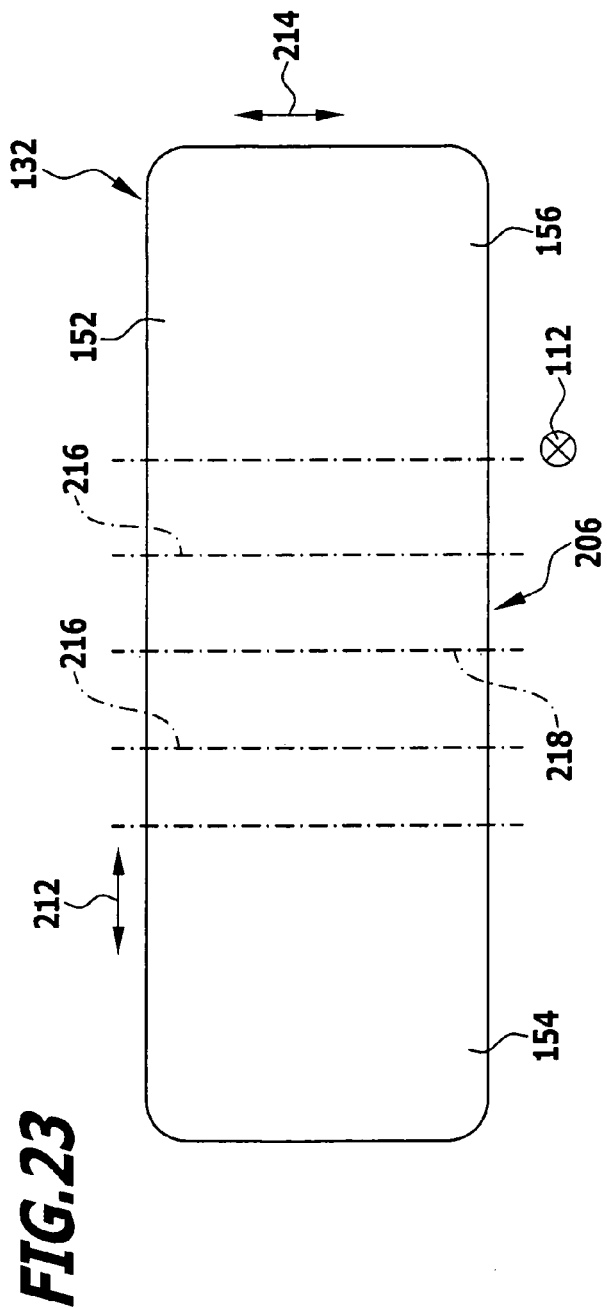
FIG.24
FIG.23

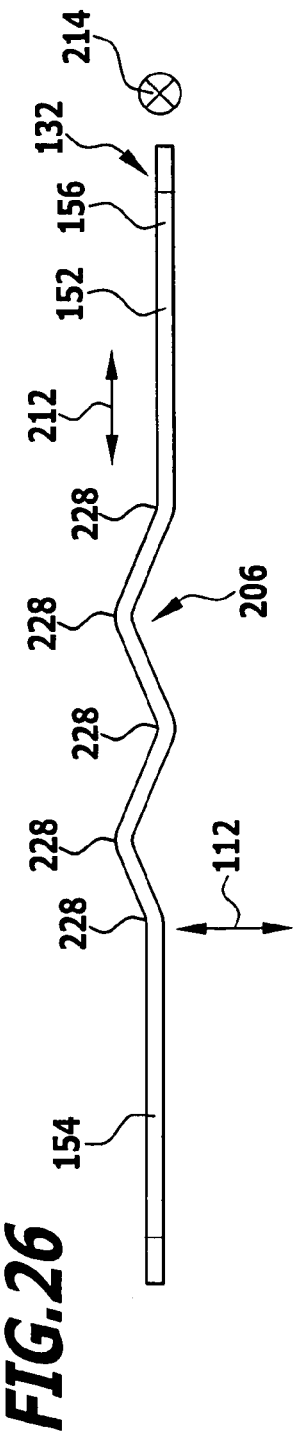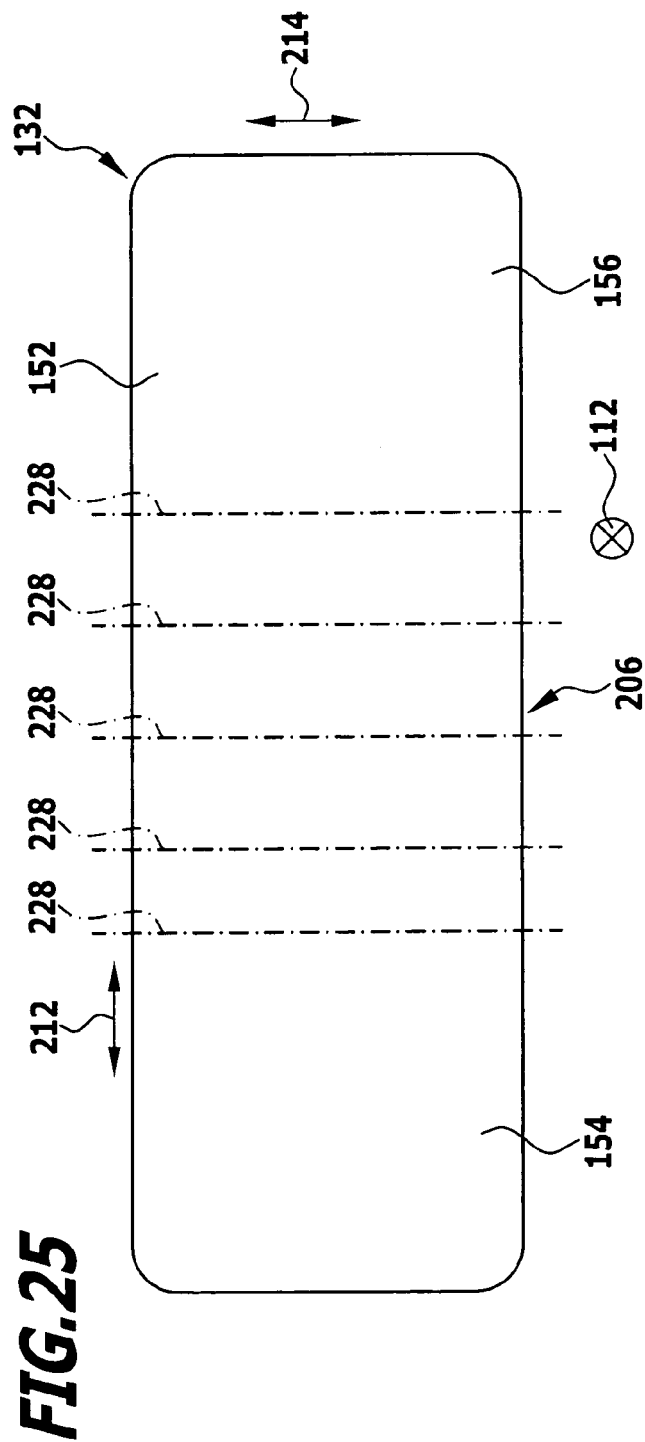

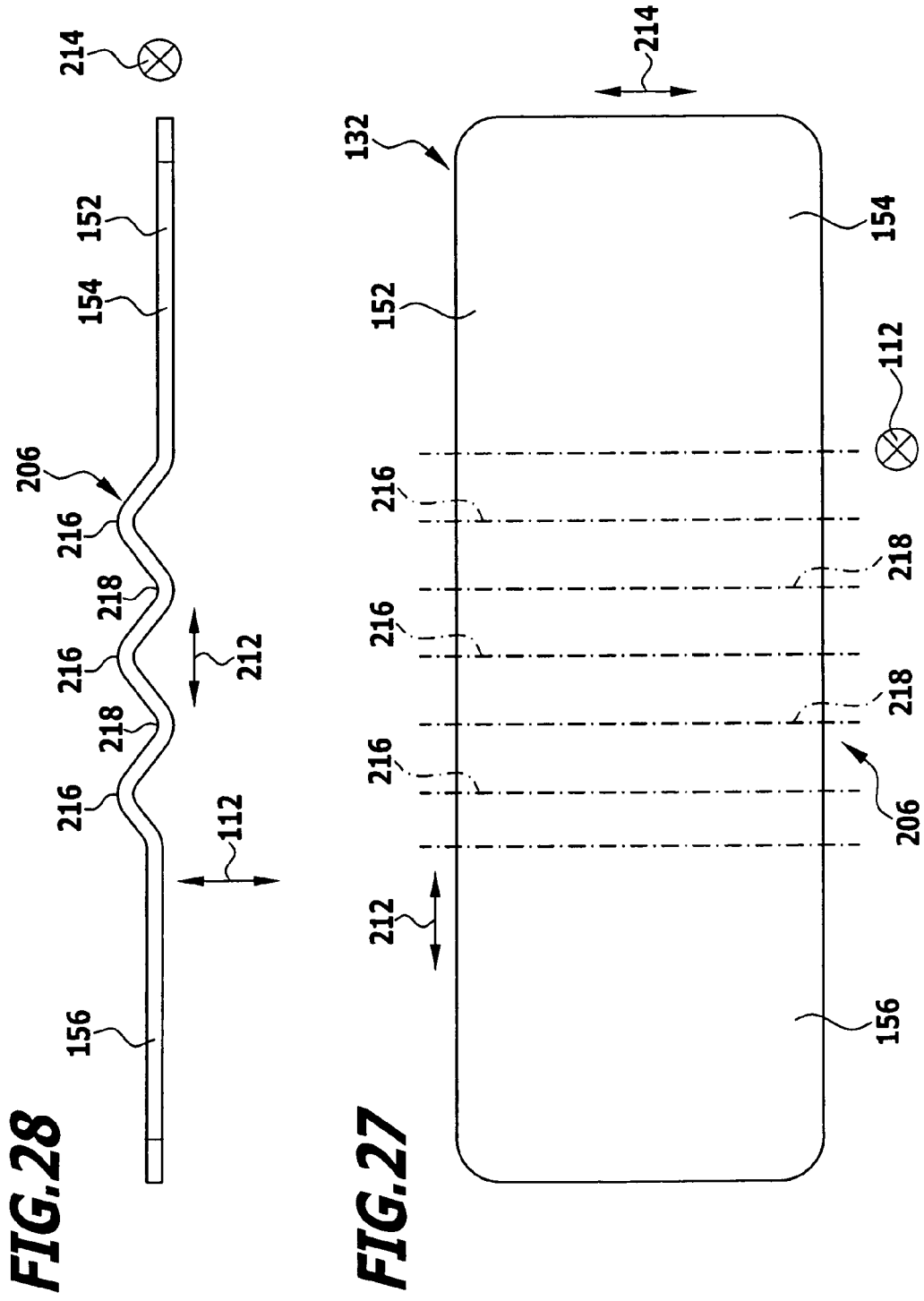

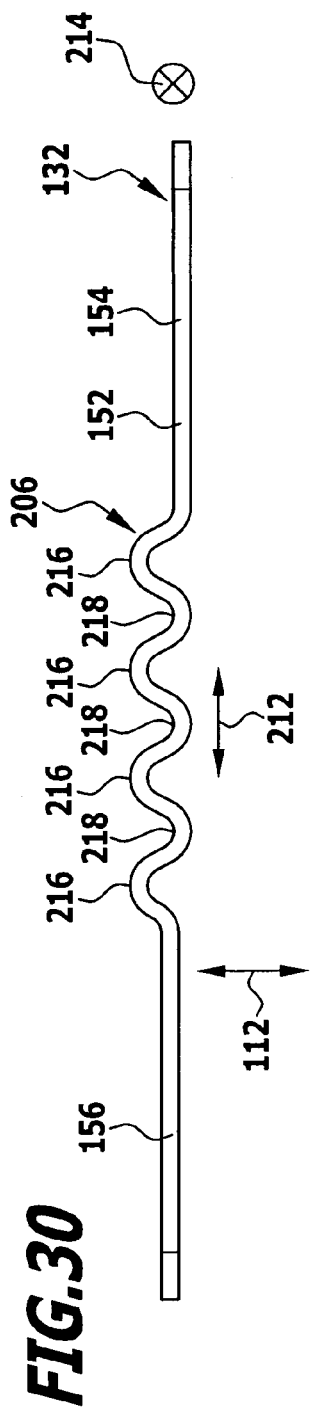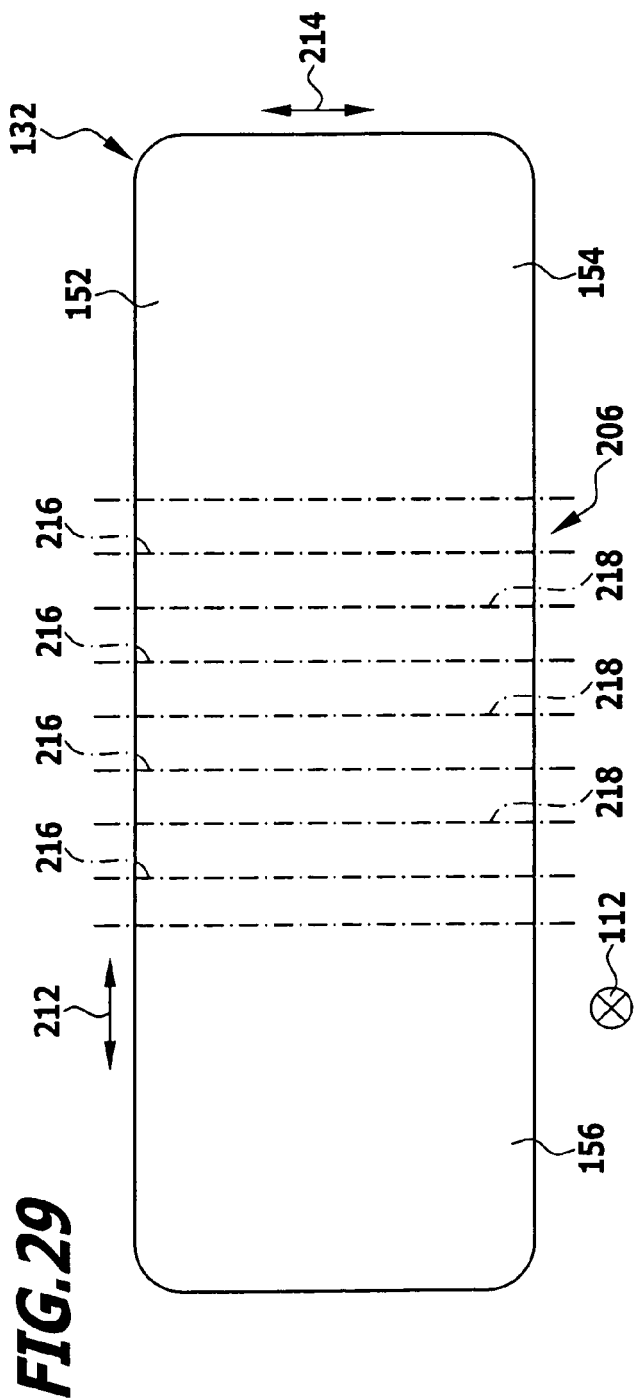

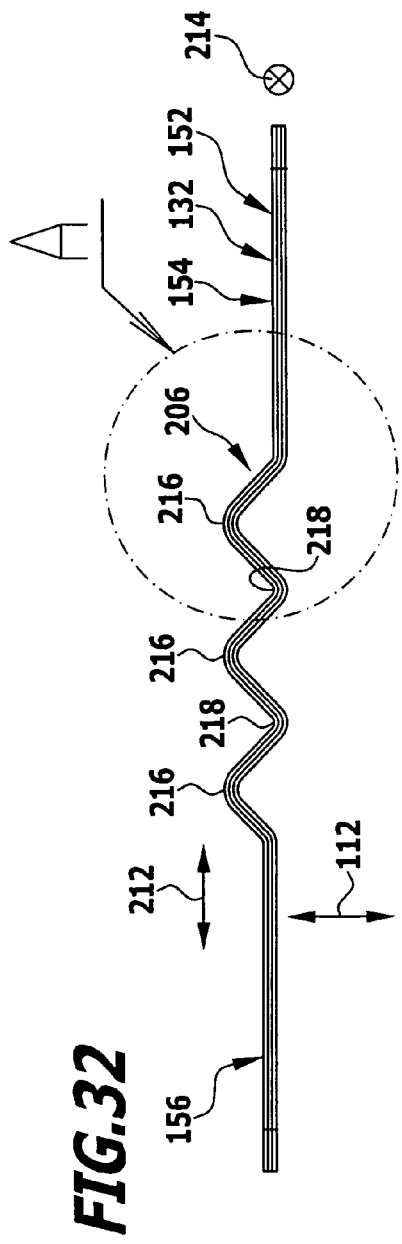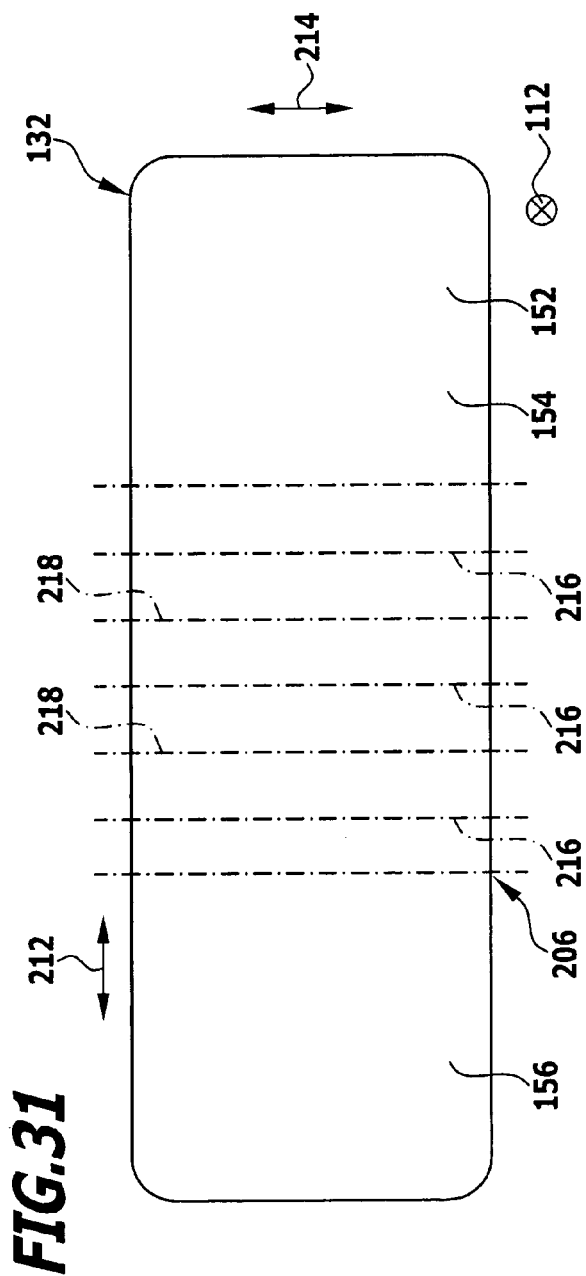

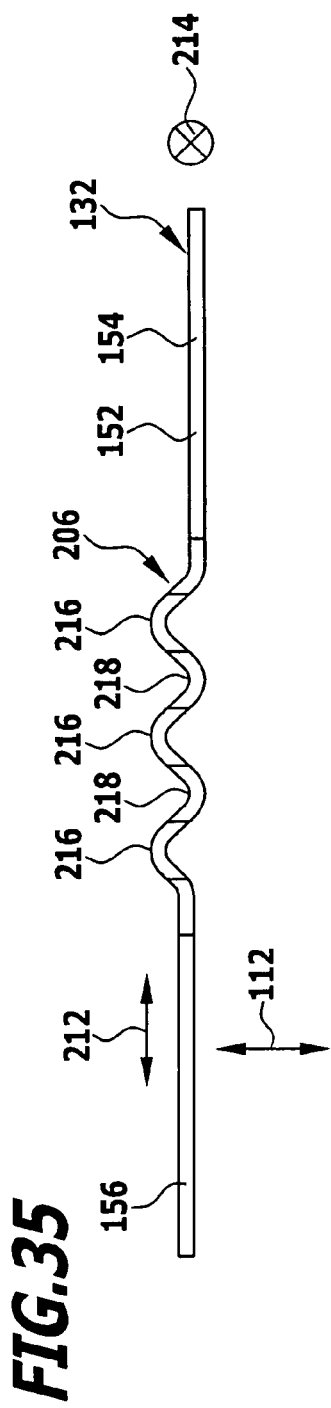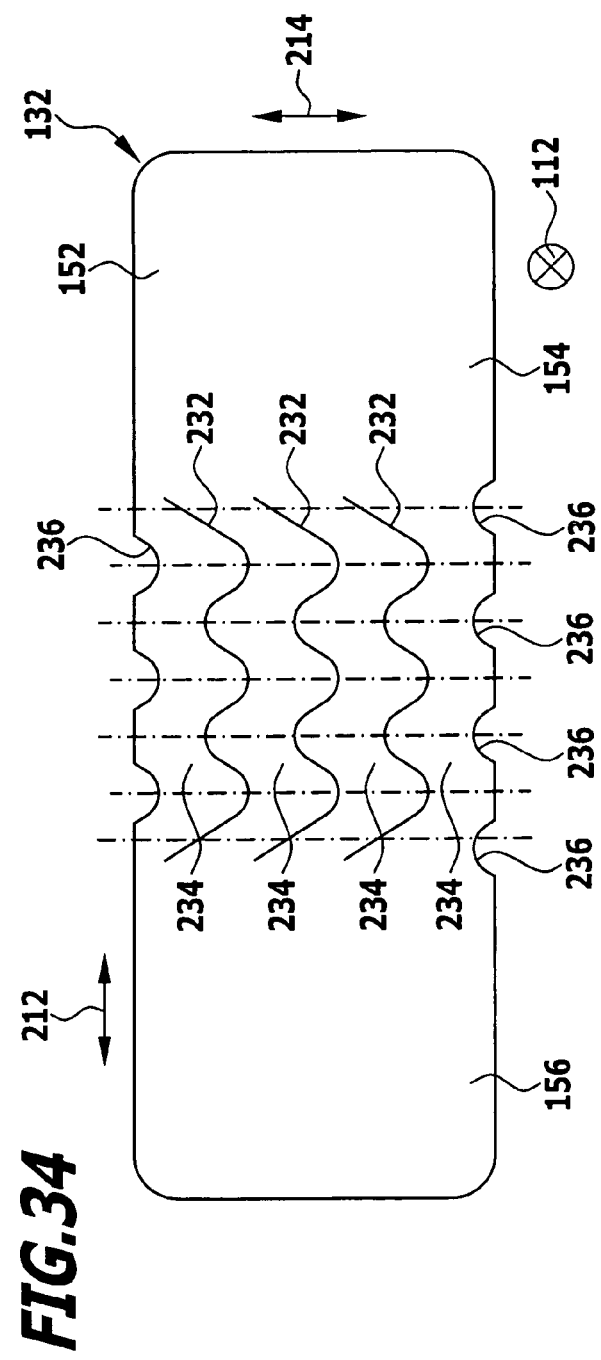
FIG.35
FIG.34

CELL CONNECTOR

RELATED APPLICATION

This application is a continuation application of PCT/EP2010/053585 filed on Mar. 19, 2010, the entire specification of which is incorporated herein by reference.

FIELD OF DISCLOSURE

The present invention relates to a cell connector for the electrically conductive connection of a first cell terminal of a first electrochemical cell and a second cell terminal of a second electrochemical cell of an electrochemical device.

BACKGROUND

Such electrochemical devices can be configured in particular as electrical accumulators, e.g. as lithium-ion accumulators.

In the case of a lithium-ion accumulator the voltage difference between the two cell terminals (poles) of an individual accumulator cell amounts to approximately 3.6 V. To obtain a higher voltage level of approximately 360 V, for example, needed for many applications, e.g. in automotive drive technology, a plurality of such accumulator cells (e.g. approximately 100) must be electrically connected in series.

In this case, the accumulator cells or in general electrochemical cells can be combined into modules, which respectively contain a plurality of such electrochemical cells, wherein the installation direction of adjacently arranged cells alternates so that positive and negative cell terminals alternately lie adjacent to one another.

These adjacent cell terminals of opposite polarity are directly connected to one another by means of a respective cell terminal for the series connection of the cells.

SUMMARY OF THE INVENTION

The object forming the basis of the present invention is to provide a cell connector for an electrochemical device of the aforementioned type, which allows a reliable and fail-safe connection of the cell terminals.

This object is achieved according to the invention with a cell connector with the features of the preamble of claim 1 in that the cell connector comprises a first contact section for connection to the first cell terminal, a second contact section for connection to the second cell terminal and an elastically and/or plastically deformable compensation region, which connects the first contact section and the second contact section of the cell connector to one another and allows a movement of these contact sections relative to one another.

Because of this possibility of movement of the two contact sections of the cell connector relative to one another, the elastically and/or plastically deformable compensation region serves to at least partially compensate a) a difference between a longitudinal expansion of the cell connector, on the one hand, and a change in the spacing between the longitudinal axes of the cell terminals connected to one another by means of the cell connector, on the other hand, and/or b) a difference between a longitudinal expansion of the first electrochemical cell, on the one hand, and a longitudinal expansion of the second electrochemical cell, on the other hand.

Additionally hereto, the elastically and/or plastically deformable compensation region can also serve to at least partially compensate differences in the positions of cell terminals to be connected to one another based on manufacturing tolerances, in particular in the axial direction of the electrochemical cells.

In a preferred configuration of the invention it is provided that the compensation region allows a movement of the contact sections relative to one another in a longitudinal direction of the cell connector, which in the assembled state of the cell connector is oriented transversely, preferably substantially perpendicularly, to the axial direction of the electrochemical cells to be connected to one another.

Alternatively or additionally hereto, it can be provided that the compensation region allows a movement of the contact sections relative to one another in a contact direction of the cell connector, which in the assembled state of the cell connector is oriented substantially parallel to the axial direction of the electrochemical cells to be connected to one another.

The compensation region is preferably arranged between the first contact section and the second contact section of the cell connector.

To allow the desired relative movement between the two contact sections of the cell connector, the compensation region is preferably provided with profiling, in particular with an undulating structure and/or a zigzag structure and/or a bead structure.

In particular, it can be provided that the compensation region of the cell connector has an undulation or bead or bending line running transversely, preferably substantially perpendicularly, to the longitudinal direction of the cell connector.

In this case, the bead can be configured as a full bead or a half-bead.

In preferred embodiments of the cell connector the compensation region of the cell connector has a plurality of wave peaks and/or wave troughs running transversely, preferably substantially perpendicularly, to the longitudinal direction of the cell connector or a plurality of beads running in this direction or a plurality of bending lines running in this direction, as a result of which the deformability of the compensation region and the mobility of the contact sections relative to one another are increased.

Moreover, it can be provided that the compensation region of the cell connector comprises at least one, preferably undulating, web.

In particular, such a web can connect the first contact section of the cell connector and the second contact section of the cell connector to one another.

A plurality of webs of this type are preferably arranged adjacent to one another.

Moreover, it can be provided that the cell connector comprises two or more material layers, which are laminated onto one another.

To allow a voltage meter to be coupled to the cell connector and thus the cell terminals connected to one another by means of the cell connector, it is favourable if the cell connector has at least one, preferably web-like voltage tap.

To enable only low mechanical stresses and restoring forces to be exerted by the cell connector on the cell terminals after the at least partial compensation of the differences in position between the cell terminals to be connected to one another, it is favourable if the compensation region of the cell connector is formed from a material with a yield point R of 60 N/mm² at most, preferably 40 N/mm² at most, in particular 20 N/mm² at most.

The compensation region is preferably formed from aluminium or an aluminium alloy.

The cell connector according to the invention is suitable for use in an electrochemical device, which comprises at least a first electrochemical cell with a first cell terminal, a second electrochemical cell with a second cell terminal and a cell connector according to the invention connecting the first cell terminal and the second cell terminal electrically conductively to one another.

If such an electrochemical device comprises a receiving device with at least a first seating for the first electrochemical cell and a second seating for the section electrochemical cell, then it is advantageous for reducing mechanical stresses, which occur during operation of the electrochemical device and can arise as a result of different thermal expansions of the cell connector, on the one hand, and the receiving device for the electrochemical cells, on the other hand, if the cell connector comprises a base body, which is formed from a material that has a coefficient of thermal expansion $\alpha$, which differs by less than 10% from the coefficient of thermal expansion $\alpha$ of the material of the receiving device.

If the coefficients of thermal expansion of these materials vary significantly from ambient temperature to the operating temperature of the electrochemical device, then this specification relates to the respective average coefficient of thermal expansion in the case of an increase in temperature from ambient temperature (20° C.) to the operating temperature of the electrochemical device (that amounts to 60° C., for example).

To avoid such mechanical stresses it is particularly favourable if the material of the base body and the material of the receiving device are substantially the same.

In particular, it can be provided that the material of the base body and the material of the receiving device are aluminium or an aluminium alloy.

Alternatively hereto, it can also be provided that the cell connector comprises a base body, which extends from the first contact section for connecting the first cell terminal to the second contact section for connecting the second cell terminal and is formed from at least two parts, which have different coefficients of thermal expansion $\alpha$, and wherein the effective coefficient of thermal expansion of the base body resulting from the different coefficients of thermal expansion with respect to a thermal longitudinal expansion of the base body differs by less than 10% from the coefficient of thermal expansion $\alpha$ of the material of the receiving device.

The electrochemical device can be configured in particular as an accumulator, in particular as a lithium-ion accumulator.

The present invention additionally relates to a method for the electrically conductive connection of a first cell terminal of a first electrochemical cell to a second cell terminal of a second electrochemical cell of an electrochemical device.

A further object forming the basis of the present invention is to provide such a method, by means of which a reliable and fail-safe connection of the cell terminals is achieved.

This object is achieved according to the invention by a method for the electrically conductive connection of a first cell terminal of a first electrochemical cell to a second cell terminal of a second electrochemical cell of an electrochemical device, which comprises the following method steps:

providing a cell connector, which comprises a first contact section for connection to the first cell terminal, a second contact section for connection to the second cell terminal and an elastically and/or plastically deformable compensation region, which connects the first contact section and the second contact section to one another and allows a movement of these contact sections relative to one another;

connecting the cell connector to the first cell terminal and to the second cell terminal.

The connection of the cell connector to the cell terminals is preferably achieved in an integral manner in this case.

To reduce the mechanical stresses that occur at the connection points between the cell connector and the cell terminals to be connected to one another, it can be provided that the cell connector is already deformed, preferably plastically, before connection to the first cell terminal and/or before connection to the second cell terminal such that the first contact section of the cell connector to be connected to the first cell terminal and the second contact section of the cell connector to be connected to the second cell terminal are displaced relative to one another such that differences in the positions of the first cell terminal and the second cell terminal in the axial direction of the first electrochemical cell and the second electrochemical cell are compensated at least partially, preferably substantially completely.

It is particularly favourable in this case if the relative position of the first cell terminal and the second cell terminal in the axial direction of the first electrochemical cell and the second electrochemical cell are measured before deformation of the cell connector, so that the subsequent deformation of the cell connector, in particular the compensation region of the cell connector, can be achieved in a targeted manner.

Moreover, the yield point at least of a portion of the material of the cell connector can be reduced by a thermal treatment before and/or during connection of the cell connector to the first cell terminal or to the second cell terminal. The mechanical stresses at the connection point can be reduced during and/or after the integral connection of the cell connector to the first cell terminal or to the second cell terminal as a result of such a reduction of the yield point of the material by means of a thermal treatment.

The cell connector of the electrochemical device according to the invention can use the synergies of different materials and reduces or overcomes the disadvantages that are characteristic of known types of connection of such cell connectors.

The cell connector has a low electrical resistivity and low contact resistances at the junctions between the cell terminals and the cell connector.

Moreover, the cell connector has a low mass and a good handling ability and is inexpensive to produce.

The cell connector can be produced using established manufacturing methods and can be connected to the cell terminal in a fail-safe manner using reliable methods.

The type of connection of the cell connector to the cell terminals ensures good corrosion protection on all structural parts involved.

Particular configurations of the cell connector and the electrochemical device according to the invention provide the advantages that a longitudinal offset for compensation of relative movements of the cell terminals relative to one another and/or a correction of differences in the positions of the cell terminals in the axial direction of the cells caused by manufacturing tolerances or by different thermal changes in length of the electrochemical cells are integrated into the cell connector.

If a length equalisation field is integrated into the cell connector, then the cells connected to one another by the cell connector are protected and their longevity promoted.

Moreover, at least one voltage tap can be integrated into the cell connector for individual cell monitoring. A voltage meter can be coupled to each cell connector in a simple manner as a result of this.

A plurality of cell connectors can be produced jointly in a cohesive connector assembly, e.g. as stamped bent parts, and can then be handled jointly until they are fixed to the respectively associated cell terminals. This accelerates the assembly of the electrochemical device significantly, since the cell connectors no longer have to be passed individually to the cell terminals to be connected. The handling costs are significantly reduced as a result.

A process improvement is achieved as a result of the modular structure of the cell connectors.

The present invention allows the production of inexpensive, fail-safe connecting elements for connection of individual electrochemical cells with a high power density and short charge or discharge cycles.

As a result of the cell connector a direct connection can be formed between two respective electrochemical cells that is as short and low-loss as possible.

The conductivity of the cell connector meets high requirements, in particular when a single-material welding or soldering of the cell terminals to the cell connector occurs.

If the electrochemical device according to the invention is configured as an accumulator, it is particularly suitable as a heavy-duty energy source, e.g. for the drive of motor vehicles.

Further features and advantages of the invention are the subject of the following description and the illustrative representation of exemplary embodiments.

BRIEF DESCRIPTION OF THE DRAWINGS

FIG. 14 is a schematic plan view onto a cell connector, which has a deformable compensation region with an undulating structure, wherein the undulating structure has an amplitude directed parallel to the axial direction of the electrochemical cells and a plurality of, e.g. four, wave peaks running transversely to the axial direction of the electrochemical cells and a plurality of, e.g. three, wave troughs running transversely to the axial direction of the electrochemical cells, and wherein the cell connector additionally has holding webs for connecting the cell connector to the circuit board of the module;

FIG. 15 is a schematic side view of the cell connector from FIG. 14;

FIG. 16 is a schematic side view of the cell connector from FIG. 14 and the two electrochemical cells, which are connected to one another by means of the cell connector;

FIG. 17 is a schematic plan view onto an alternative embodiment of a cell connector, which has a deformable compensation region, which comprises an undulating structure, wherein the undulating structure has an amplitude in the axial direction of the electrochemical cells and a plurality of, e.g. three, wave peaks running transversely to the axial direction of the electrochemical cells and a plurality of, e.g. two, wave troughs running transversely to the axial direction of the electrochemical cells, and wherein the cell connector has, moreover, no holding webs;

FIG. 18 is a schematic side view of the cell connector from FIG. 17;

FIG. 19 is a schematic plan view onto an alternative embodiment of a cell connector with a deformable compensation region with a half-bead structure, which merges into contact regions of the cell connector at bending lines;

FIG. 20 is a schematic side view of the cell connector from FIG. 19;

FIG. 21 is a schematic plan view onto an alternative embodiment of a cell connector with a deformable compensation region, which has an undulating structure, wherein the undulating structure comprises an amplitude in the axial direction of the electrochemical cells and a wave peak extending transversely to the axial direction of the electrochemical cells and a wave trough extending transversely to the axial direction of the electrochemical cells;

FIG. 22 is a schematic side view of the cell connector from FIG. 21;

FIG. 23 is a schematic plan view onto an alternative embodiment of a cell connector with a deformable compensation region, which has an undulating structure, wherein the undulating structure comprises an amplitude in the axial direction of the electrochemical cells and a plurality of, e.g. two, wave peaks extending transversely to the axial direction of the electrochemical cells and a wave trough extending transversely to the axial direction of the electrochemical cells;

FIG. 24 is a schematic side view of the cell connector from FIG. 23;

FIG. 25 is a schematic plan view onto an alternative embodiment of a cell connector with a deformable compensation region, which has a zigzag structure, wherein the zigzag structure has a plurality of, e.g. five, bending lines running transversely to the axial direction of the electrochemical cells;

FIG. 26 is a schematic side view of the cell connector from FIG. 25;

FIG. 27 is a schematic plan view onto an alternative embodiment of a cell connector with a deformable compensation region, which has an undulating structure, wherein the undulating structure comprises an amplitude in the axial direction of the electrochemical cells and a plurality of, e.g. three, wave peaks extending transversely to the axial direction of the electrochemical cells and a plurality of, e.g. two, wave troughs extending transversely to the axial direction of the electrochemical cells;

FIG. 28 is a schematic side view of the cell connector from FIG. 27;

FIG. 29 is a schematic plan view onto an alternative embodiment of a cell connector with a deformable compensation region, which has an undulating structure, wherein the undulating structure comprises an amplitude in the axial direction of the electrochemical cells and a plurality of, e.g. four, wave peaks extending transversely to the axial direction of the electrochemical cells and a plurality of, e.g. three, wave troughs extending transversely to the axial direction of the electrochemical cells;

FIG. 30 is a schematic side view of the cell connector from FIG. 29;

FIG. 31 is a schematic plan view onto an alternative embodiment of a cell connector with a deformable compensation region, which has an undulating structure, wherein the undulating structure comprises an amplitude in the axial direction of the electrochemical cells and a plurality of, e.g. three, wave peaks extending transversely to the axial direction of the electrochemical cells and a plurality of, e.g. two, wave troughs extending transversely to the axial direction of the electrochemical cells, wherein a base body of the cell connector is configured as a laminate comprising a plurality of, e.g. three, superposed layers or material layers;

FIG. 32 is a schematic side view of the cell connector from FIG. 31;

FIG. 34 is a schematic plan view onto an alternative embodiment of a cell connector with a deformable compensation region, which has an undulating structure, wherein the undulating structure comprises an amplitude in the axial direction of the electrochemical cells and a plurality of, e.g. three, wave peaks extending transversely to the axial direction of the electrochemical cells and a plurality of, e.g. two, wave troughs extending transversely to the axial direction of the electrochemical cells, and wherein the compensation region is divided by a plurality of, e.g. three, undulating slits into a plurality of, e.g. four, undulating webs, which are arranged adjacent to one another in a direction running transversely to the axial direction of the electrochemical cells, wherein the undulation of the slits and the undulation of the webs have an amplitude transversely to the axial direction of the electrochemical cells;

FIG. 35 is a schematic side view of the cell connector from FIG. 34;

Identical or functionally equivalent elements are given the same reference numerals in all figures.

DETAILED DESCRIPTION OF THE INVENTION

Figure 1:
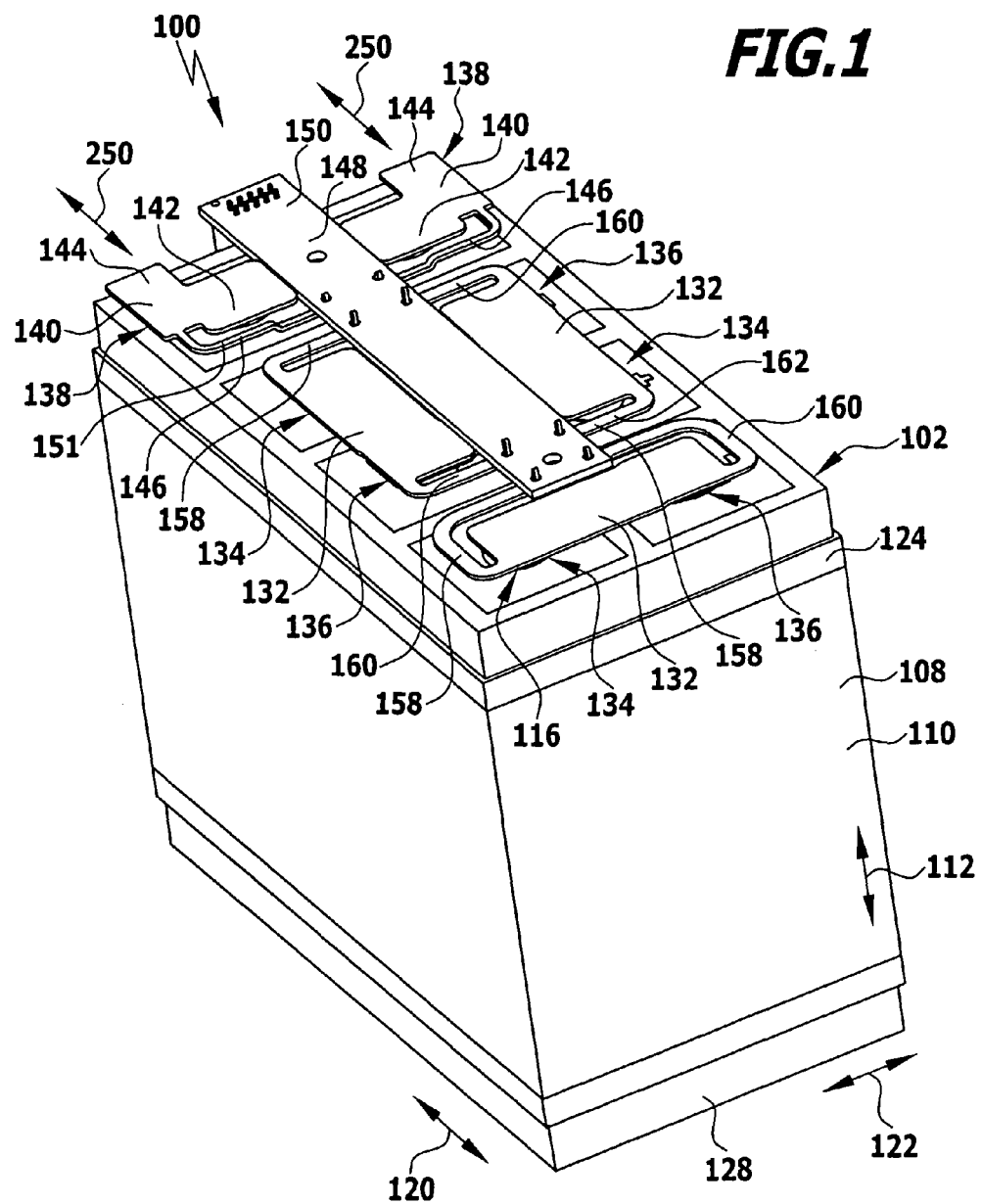
FIG. 1 is a schematic perspective representation of a module of an electrochemical device, which comprises a plurality of, e.g. eight, electrochemical cells, a receiving device to receive the cells, a plurality of cell connectors for the electrically conductive connection of cell terminals of two respective electrochemical cells, a circuit board for the voltage tap of the cell connectors and electrical connections for the electrically conductive connection of the module to other modules, to a charging device or to a load.

An electrochemical device given the reference 100 overall comprises a plurality of electrochemical modules 102, of which one is represented in its entirety in FIGS. 1 to 4 as an example. Each of the modules 102 comprises a plurality of, e.g. eight, electrochemical cells 104, which are respectively received in a seating of a receiving device 108 of the module 102.

This receiving device 108 can be configured in particular as a cooling body 110, which is in thermally conductive contact with the electrochemical cells 104 received therein in order to conduct heat away from the electrochemical cells 104 during operation of the electrochemical device 100.

The receiving device 108 is preferably formed from a highly thermally conductive material, e.g. from aluminium or an aluminium alloy.

Figure 3:
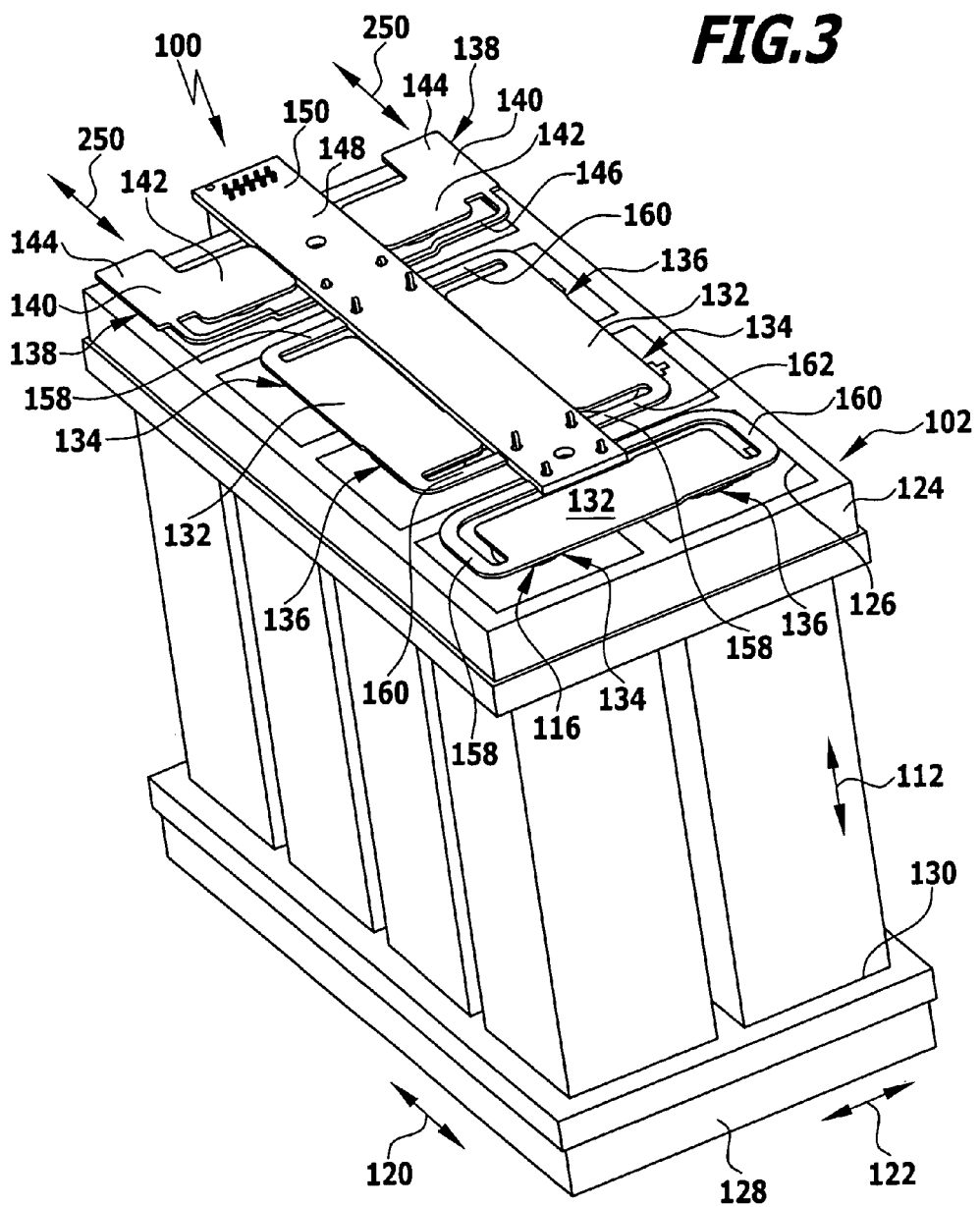
FIG. 3 is a schematic perspective representation of the module corresponding to FIG. 1 without the receiving device.
Figure 4:
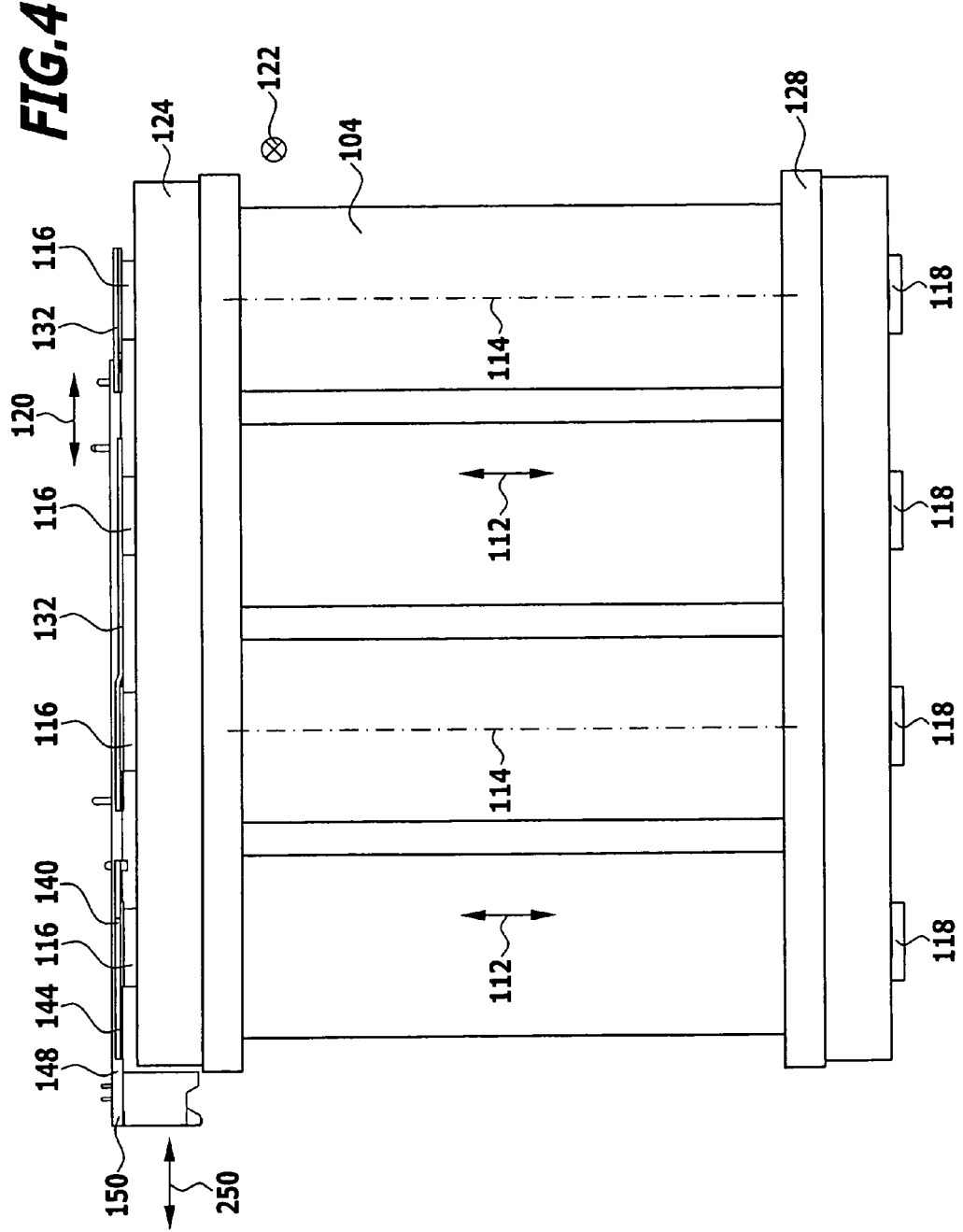
FIG. 4 is a schematic side view of the module without the receiving device from FIG. 3.
Figure 5:
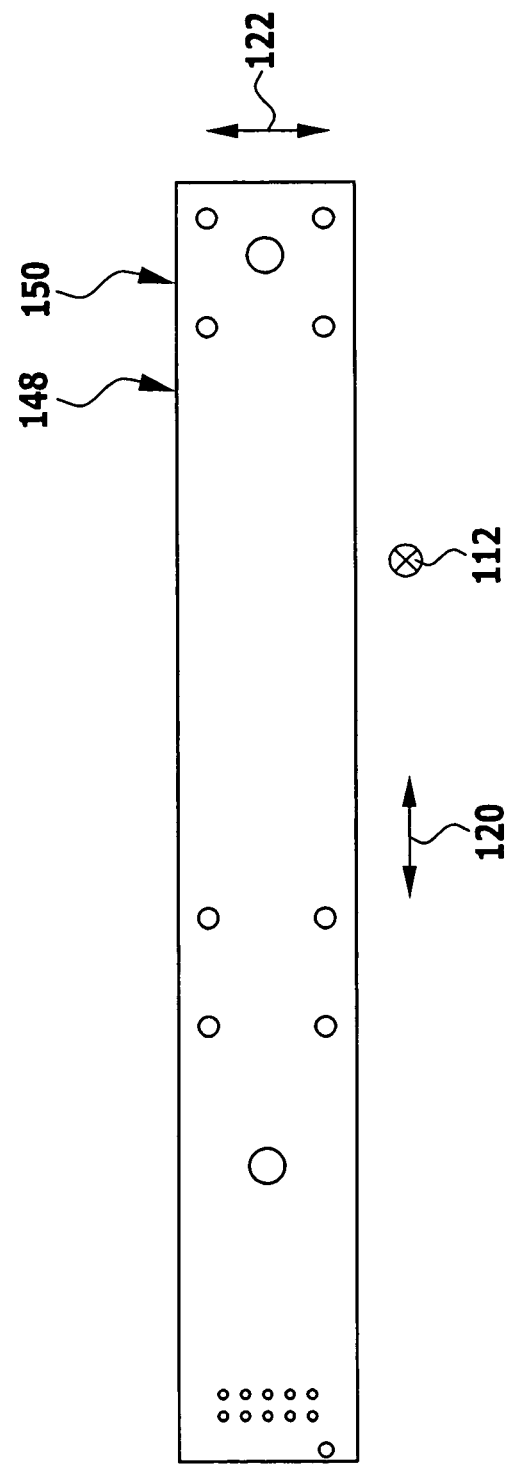
FIG. 5 is a schematic plan view onto the circuit board of the module from FIGS. 1 to 4.

As is best seen from FIGS. 3 and 4, which show the module 102 without the receiving device 108, the electrochemical cells 104 are arranged and oriented in the receiving device 108 surrounding them such that the axial directions 112 of the electrochemical cells 104 that run parallel to the central longitudinal axes 114 of the electrochemical cells 104 are oriented substantially parallel to one another.

As is best seen from FIG. 4, each of the electrochemical cells 104 extends from a front cell terminal 116 (shown at the top in FIG. 4) in the respective axial direction 112 to a lower cell terminal 118 (shown at the bottom in FIG. 4), wherein each cell terminal respectively forms a positive pole or a negative pole of the electrochemical cell 104.

In this case the central longitudinal axes 114 of the electrochemical cells 104 are at the same time central longitudinal axes of the cell terminals 116, 118 of the respective electrochemical cells 104.

In the module 102 adjacent electrochemical cells 104 are respectively oriented such that the cell terminals of two adjacent cells arranged on the same side of the module have opposite polarity.

Figure 6:
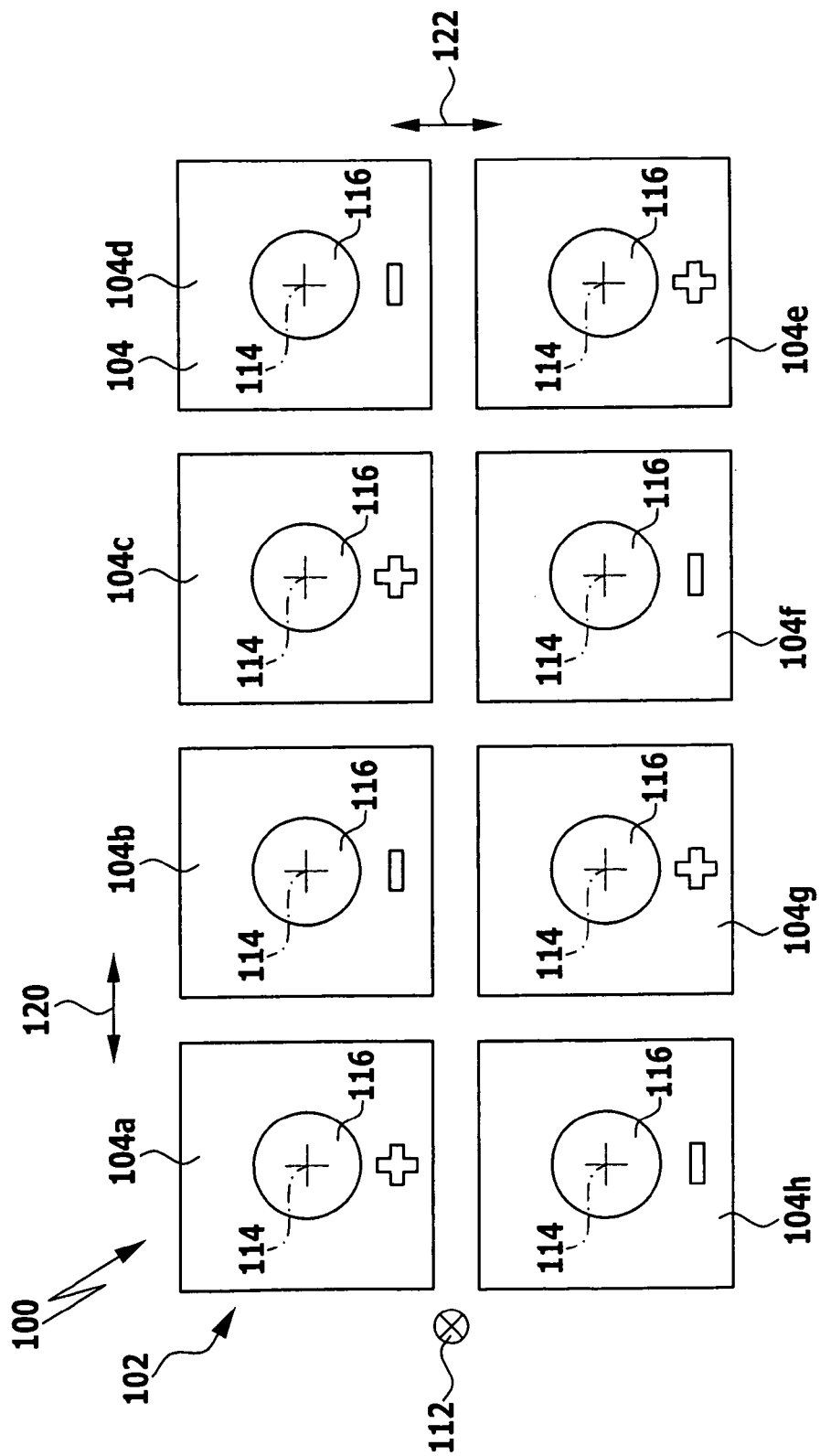
FIG. 6 is a schematic plan view onto the front cell terminals of the electrochemical cells of the module.

This is illustrated below with reference to FIG. 6, which shows the polarities of the (e.g. eight) front cell terminals 116 of the eight electrochemical cells 104 of a module 102.

In this case, the front cell terminal 116 of the electrochemical cell 104a forms a positive pole of the respective electrochemical cell 104a, whereas the front cell terminal 116 of the electrochemical cell 104b adjacent to the electrochemical cell 104a in a first transverse direction 120 of the module 102 forms a negative pole of the electrochemical cell 104b.

Accordingly, the front cell terminal 116 of the electrochemical cell 104c following the electrochemical cell 104b in the first transverse direction 120 forms a positive pole of the electrochemical cell 104c and the front cell terminal 116 of the electrochemical cell 104d following the electrochemical cell 104c in the first transverse direction 120 forms a positive pole of the electrochemical cell 104d.

The front cell terminal 116 of the module 102 of the electrochemical cell 104e, which follows the electrochemical cell 104d in a second transverse direction 122 oriented perpendicularly to the first transverse direction 120 of the module 102 and perpendicularly to the axial directions 112 of the electrochemical cells 104, forms a positive pole of the electrochemical cell 104e. The front cell terminal 116 of the electrochemical cell 104f following the electrochemical cell 104e in the first transverse direction 120 forms a negative pole of the electrochemical cell 104f, whereas the front cell terminal 116 of the electrochemical cell 104g following the electrochemical cell 104f in the first transverse direction 120 forms a positive pole of the electrochemical cell 104g and the front cell terminal 116 of the electrochemical cell 104h following the electrochemical cell 104g in the first transverse direction 120 finally again forms a negative pole of the electrochemical cell 104h.

If the front cell terminal 116 of an electrochemical cell 104 forms a positive pole of the respective electrochemical cell 104, then the rear cell terminal 118 forms a negative pole of the same cell 104. If the front cell terminal 116 of an electrochemical cell 104 forms a negative pole of the respective electrochemical cell 104, then the rear cell terminal 118 of the same electrochemical cell 104 forms a positive pole of the same electrochemical cell 104.

The electrochemical device 100 can be configured in particular as an accumulator, in particular as a lithium-ion accumulator, e.g. of the type $LiFePO_4$.

The electrochemical cells 104 of the electrochemical modules 102 can accordingly be configured as accumulator cells, in particular as lithium-ion accumulator cells, e.g. of the type $LiFePO_4$.

As can be seen from FIGS. 3 and 4 in particular, the front ends of the electrochemical cells 104 extend with the front cell terminals 116 through a front holder frame 124, which has a respective passage 126 for each electrochemical cell 104, and the rear ends of the electrochemical cells 104 extend with the rear cell terminals 118 through a rear holder frame 128, which likewise has a respective passage 130 for each electrochemical cell 104.

The holder frames 124 and 128 thus serve to position the electrochemical cells 104.

The holder frames 124 and 128 can be formed from an electrically insulating material, e.g. from a plastic material.

Figure 2:
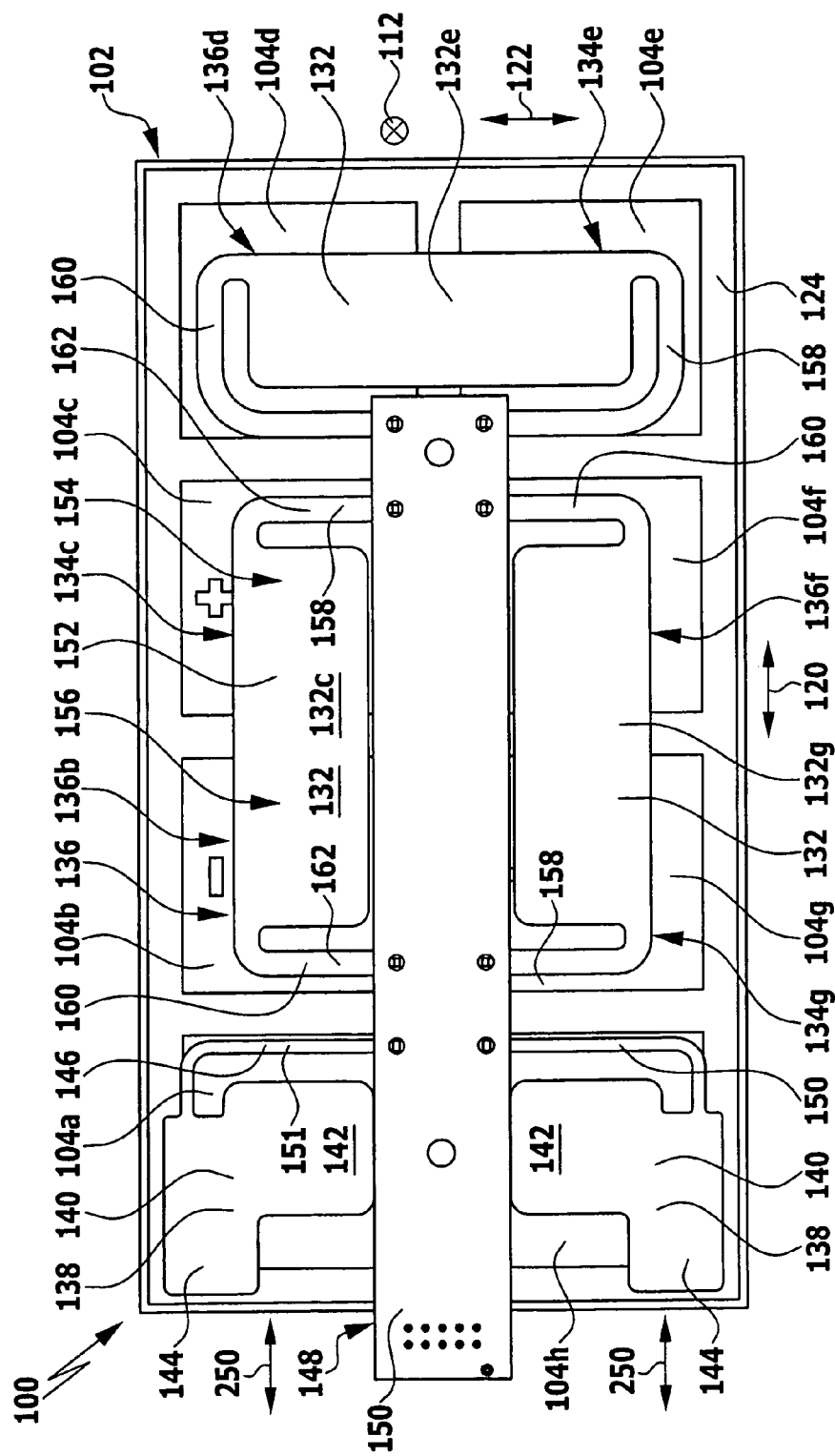
FIG. 2 is a plan view onto a front side of the module from FIG. 1.

As can be seen from the plan view of FIG. 2 in particular, the electrochemical module 102 additionally has a plurality of cell connectors 132, by means of which the cell terminals of adjacent electrochemical cells 104 are connected electrically conductively to one another with different polarity in order to connect all electrochemical cells 104 of the electrochemical module 102 electrically in series in this way.

In this case, each cell connector 132 connects a first cell terminal 134 of positive polarity to a second cell terminal 136 of negative polarity of an adjacent electrochemical cell 104.

As can be seen from FIG. 2, in particular, the first cell terminal 134c of the electrochemical cell 104c and the second cell terminal 136b of the electrochemical cell 104b are connected to one another by means of a cell connector 132c, the first cell terminal 134e of the electrochemical cell 104e and the second cell terminal 136d of the electrochemical cell 104d are connected to one another by means of a cell terminal 132e and the first cell terminal 134g of the electrochemical cell 104g and the second cell terminal 136f of the electrochemical cell 104f are connected to one another by means of a cell connector 132g.

To connect all electrochemical cells 104 of the module 102 electrically in series, moreover, the rear cell terminals 118 of adjacent electrochemical cells 104 are connected to one another by means of cell connectors 132 (not shown), namely the (negative) rear cell terminal 118 of the electrochemical cell 104a to the (positive) rear cell terminal 118 of the electrochemical cell 104b, the (negative) rear cell terminal 118 of the electrochemical cell 104c to the (positive) rear cell terminal 118 of the electrochemical cell 104d, the (negative) rear cell terminal 118 of the electrochemical cell 104e to the (positive) rear cell terminal 118 of the electrochemical cell 104f and the (negative) rear cell terminal 118 of the electrochemical cell 104g to the (positive) rear cell terminal 118 of the electrochemical cell 104h.

The front cell terminal 116 of the electrochemical cell 104a forming the start of the cell series circuit of the electrochemical module 102 and the front cell terminal 116 of the electrochemical cell 104h forming the end of the cell series circuit are respectively connected electrically conductively to an electrically conductive connection 138 of the electrochemical module 102.

Each of the electrical connections 138 comprises a contact element 140 configured as a stamped bent part, for example, with a contact section 142 fixed to the respectively associated cell terminal, with an e.g. swordlike plug section 144, which extends in the first transverse direction 120 of the electrochemical module 102, for example, and away from the contact section 142 preferably perpendicularly to the axial direction 112 of the electrochemical cells 104, and with an e.g. angled holding web 146, which is narrow compared to the contact section 142 and the plug section 144 and which connects the contact element 140 to a mounting 148 arranged on the front side of the electrochemical module 102 in the form of a circuit board 150.

An end of the holding web 146 remote from the contact section 142 and the plug section 144 of the contact element 140 is electrically conductively connected to a track (not shown) on the rear side of the circuit board 150 facing the electrochemical cells 104.

Thus the holding web 146 serves not only as a mechanical holding element, but at the same time also as a voltage tap 151.

Each of the cell connectors 132, which respectively connect a first cell terminal 134 and a second cell terminal 136 electrically conductively to one another, comprises a base body 152 with a first contact section 154, which in the assembled state of the cell connector 132 is connected to the (positive) first cell terminal 134 of an electrochemical cell 104, and a second contact section 156, which in assembled state of the cell connector 132 is connected to a (negative) second cell terminal 136 of another electrochemical cell 104.

The base body 152 of the cell connector 132 is preferably produced as a stamped bent part.

In the embodiment of a cell connector 132 shown in FIGS. 2 and 8 to 10, the base body 152 of the cell connector 132 additionally has a first holding web 158, with which the cell connector 132 is fixed to the mounting 148 and which electrically conductively connects the first contact section 154 to an associated track of the circuit board 150, and a second holding web 160, by means of which the cell connector 132 is also fixed to the mounting 148 and which electrically conductively connects the second contact section 156 to an associated track of the circuit board 150.

Each cell connector 132 of the electrochemical module 102 respectively has an associated separate track on the circuit board 150 and these tracks are connected to a control unit (not shown) of the electrochemical device 100, so that the electric potential of the respective cell connector 132 and that of the cell terminal 116 respectively associated therewith can be tapped by the control unit by means of the respectively associated track and the electrically conductive holding webs 158 or 160.

The first holding web 158 and the second holding web 160 therefore also serve as voltage taps 162, which enable the electric potential of the cell connector 132 to be tapped and evaluated by the control unit of the electrochemical device 100.

It is additionally possible to perform a charge balancing between different electrochemical cells 104 by means of the control unit of the electrochemical device 100 using voltage taps 162.

Since the first contact section 154 and the second contact section 156 of the cell connector 132 are at the same electric potential, it is sufficient if one of the holding webs 158, 160 is connected to an associated track of the circuit board 150.

A particularly simple and time-saving assembly of a plurality of cell connectors 132 and, if necessary, also of the electrical connections 138 in the form of the contact elements 140 on the cell terminals 116 of the electrochemical module 102 is achieved if the base bodies 152 of a plurality of cell connectors 132 and preferably also the contact elements of the electrical connections 138 of the module 102 are jointly separated, in particular punched, out of a starting material and then form a connector assembly 164 (see FIG. 8), in which the cell connectors 132 are connected to one another in one piece by connecting webs 166 and can thus be handled as a unit.

It can be provided in particular that the connector assembly 164, which can be configured as a stamped lattice 168, has a frame web 170 surrounding the cell connectors 132 and possibly also the contact elements 140, on which frame web the cell connectors 132 and the contact elements 140 are held by individual connecting web sections 172.

Figure 7:
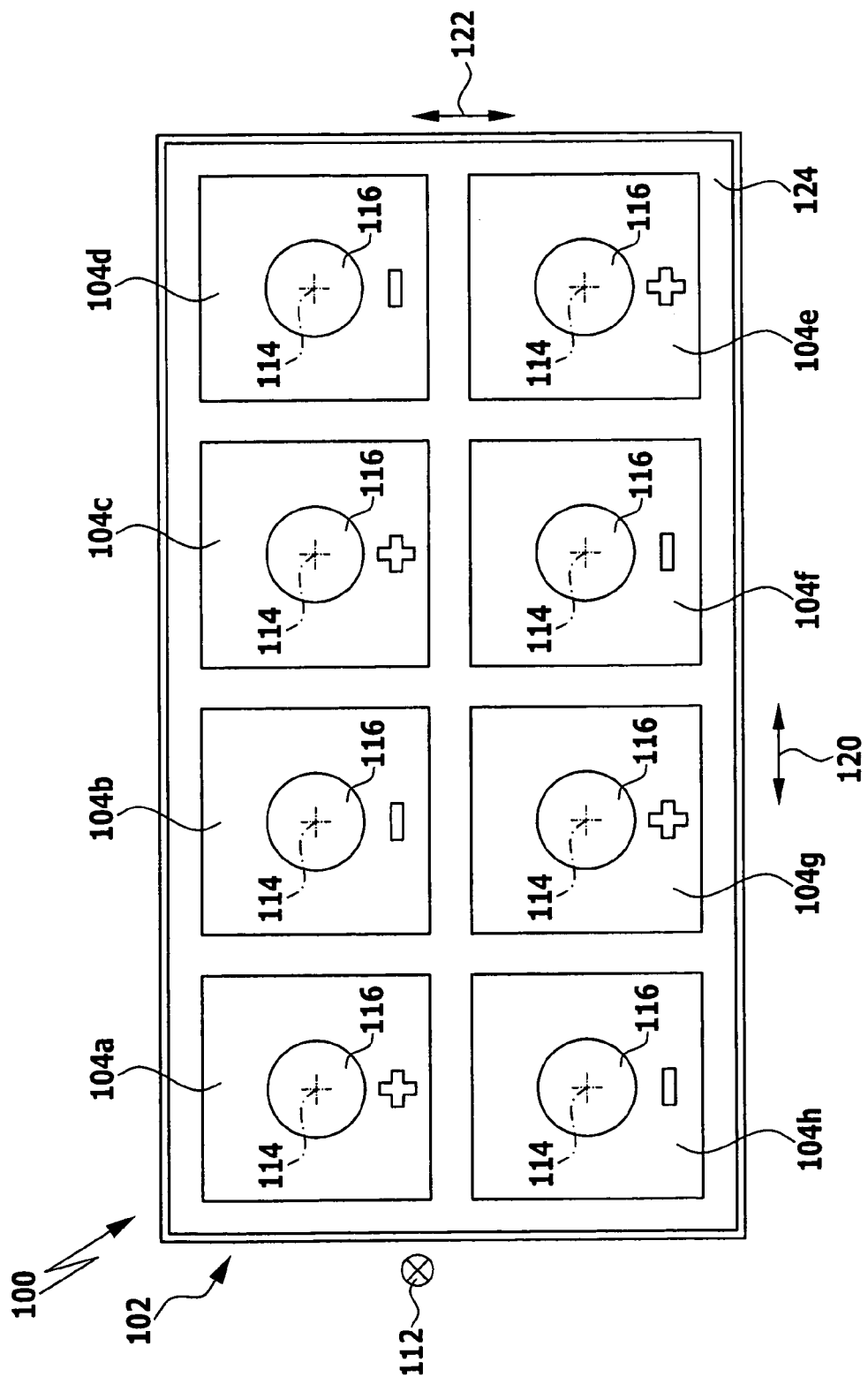
FIG. 7 is a plan view corresponding to FIG. 6 onto the front cell terminals of the electrochemical cells and a holder frame, in which the electrochemical cells are held.
Figure 8:
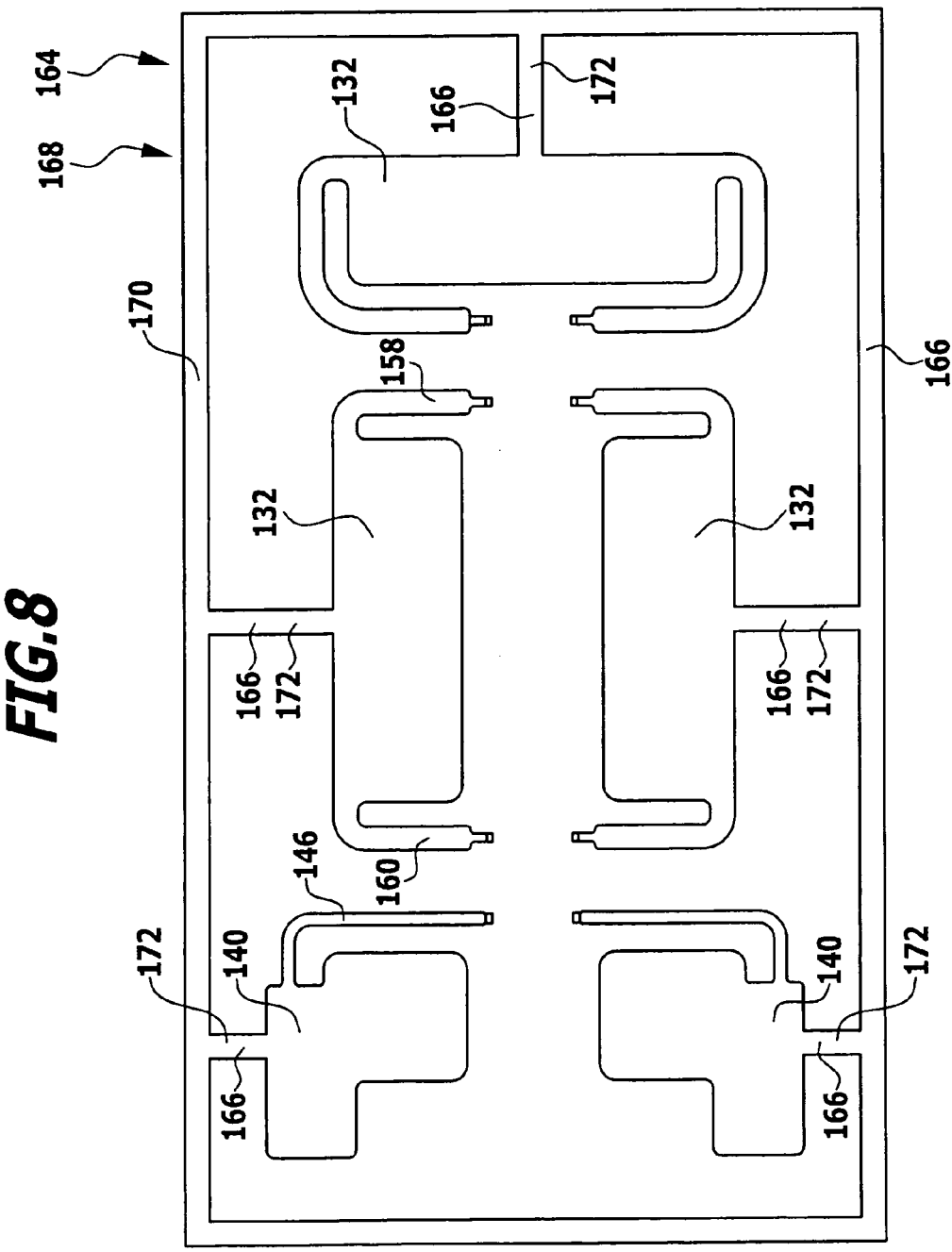
FIG. 8 is a schematic plan view onto a group of cell connectors, which are jointly separated from a starting material and connected to one another by means of connecting webs.
Figure 9:
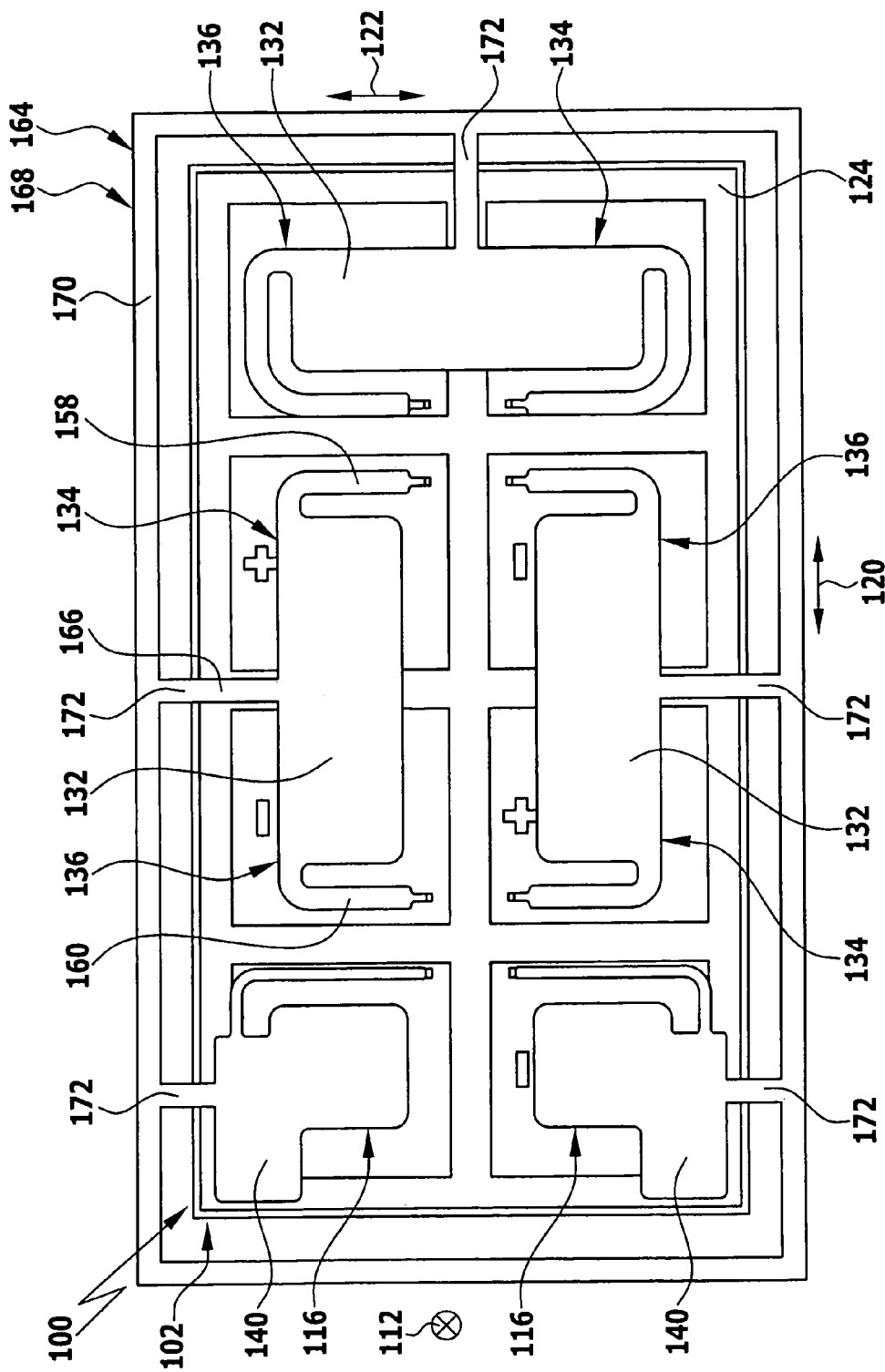
FIG. 9 is a schematic plan view onto the front cell terminals of the module with the cell connectors of the cell connector group from FIG. 8 fixed to the cell terminals, wherein the connecting webs are still present between the cell connectors.

Upon assembly of the electrochemical module 102 this connector assembly 164 is arranged in the desired relationship to the electrochemical cells 104 of the module 102, which pass through the front holding frame 124 (see FIG. 7), whereupon the contact sections 154 and 156 of the cell connectors 132 as well as the contact elements 140 of the electrical connections 138 are connected, preferably integrally, to the respectively associated cell terminal 116, so that the assembled state shown in FIG. 9 is reached, in which the cell connectors 132 and contact elements 140 of the connector assembly 164 are still connected to one another in one piece by means of the connecting webs 166.

Figure 10:
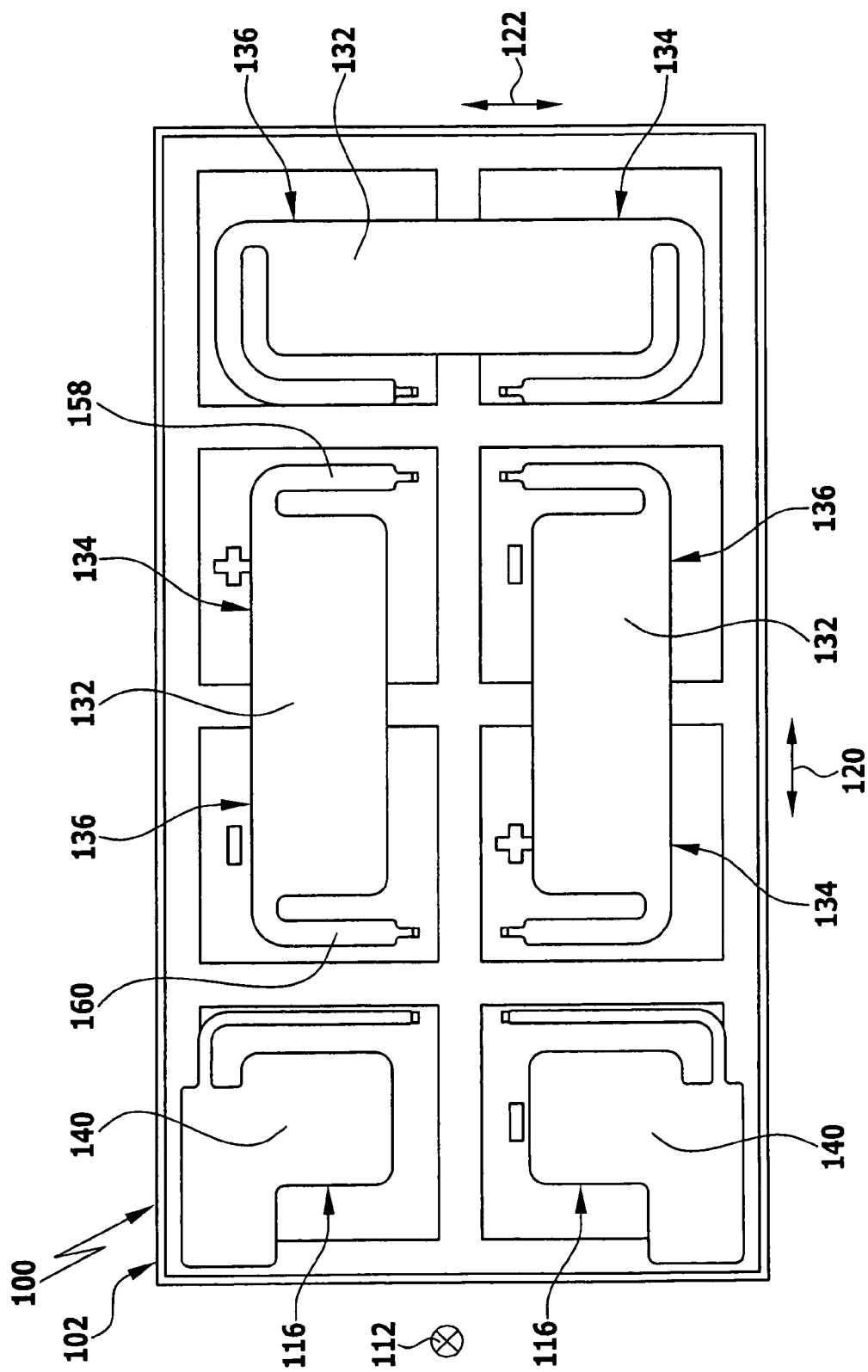
FIG. 10 is a schematic plan view onto the front cell terminals of the module and the cell connectors fixed thereto after the connecting webs between the cell connectors of the cell connector group have been removed.

The connecting webs 166, i.e. the frame web 170 and the individual connecting web sections 172, are then separated from the cell connectors 132 and the contact elements 140, so that the assembled state represented in FIG. 10 is reached, in which the individual cell connectors 132 and contact elements 140 are no longer connected electrically conductively to one another.

For completion of the electrochemical module 102, the mounting 148 in the form of the circuit board 150 is then arranged on the front side of the electrochemical module 102 and connected to the holding webs 158, 160 or 146 (preferably by soldering), so that the final assembled state of the electrochemical module 102 represented in FIG. 2 is reached.

In a variant of the above-described method for assembling the cell connectors 132 and the contact elements 140 on the cell terminals 116 of the electrochemical module 102, the connector assembly 164 is connected as a unit to the mounting 148 in the form of the circuit board 150 before the cell connectors 132 and the contact elements 140 are arranged in the desired allocation to the electrochemical cells 104 of the module 102 and are fixed to these.

For this, the holding webs 158, 160 and 146 of the cell connectors 132 or the contact elements 140 are connected to the tracks of the mounting 148, preferably by soldering.

The connecting webs 166, i.e. the frame web 170 and the individual connecting web sections 172, are then separated from the cell connectors 132 and the contact elements 140, so that the individual cell connectors 132 and contact elements 140 are no longer connected electrically conductively to one another.

For completion of the electrochemical module 102, the mounting 148 in the form of the circuit board 150 is then arranged with the cell connectors 132 and contact elements 140 held thereon on the front side of the electrochemical module 102 such that the cell connectors 132 and the contact elements 140 are positioned in the desired relationship to the electrochemical cells 104 of the module 102, which pass through the front holder frame 124, whereupon the contact sections 154 and 156 of the cell connectors 132 as well as the contact elements 140 of the electrical connections 138 are connected, preferably integrally, to the respectively associated cell terminal 116, so that the final assembled state of the electrochemical module 102 also shown in FIG. 2 is finally reached.

Figure 51:
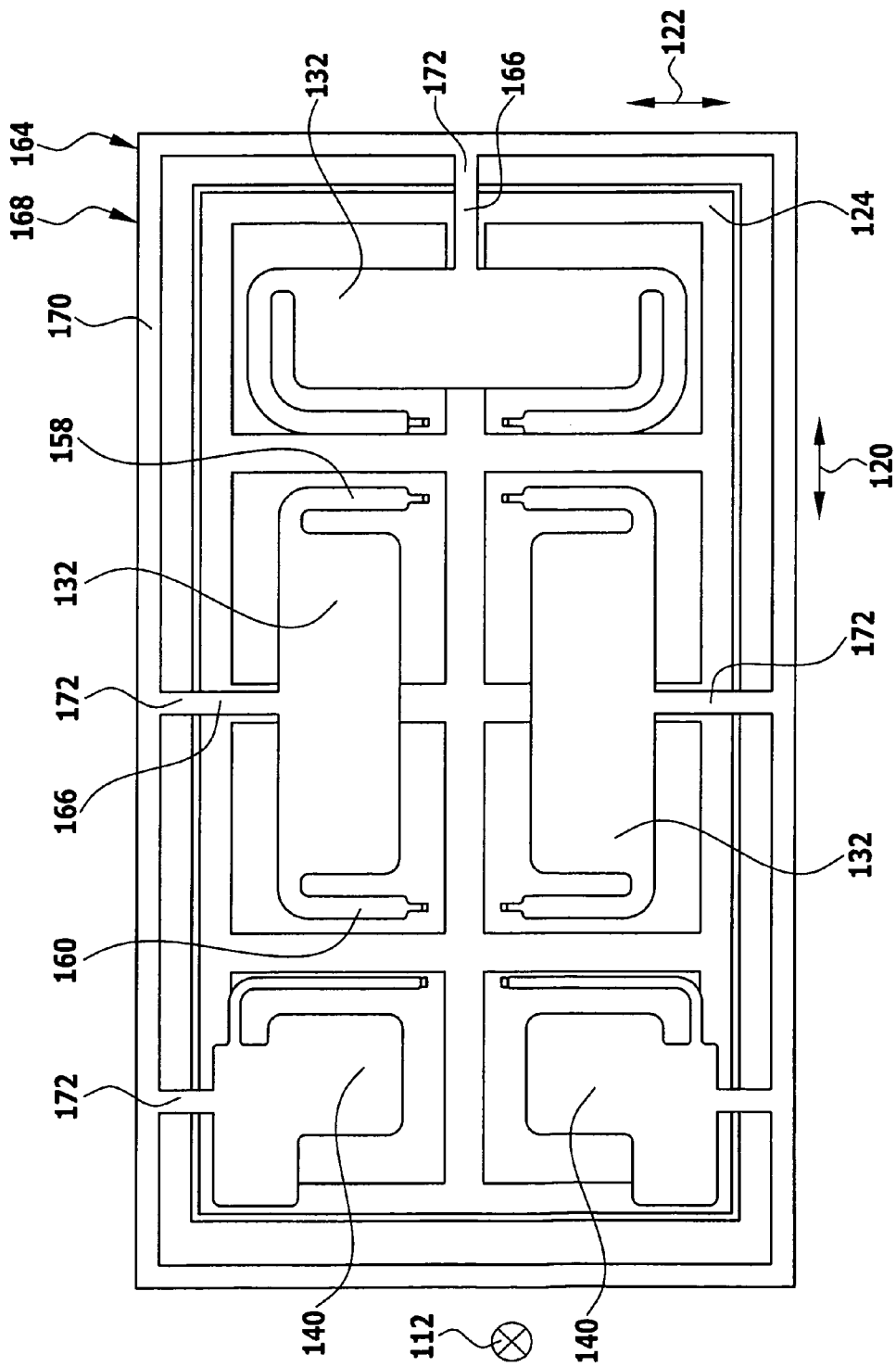
FIG. 51 is a schematic plan view onto a holder frame of the module with a connector assembly held thereon.

In a further variant of the above-described method for assembling the cell connectors 132 and the electrical connections 138 in the form of the contact elements 140 on the cell terminals 116 of the electrochemical module 102, the connector assembly 164 is not connected as a unit to the mounting 149 in the form of the circuit board 150, but to the front holder frame 124 of the electrochemical module 102, as is shown in FIG. 51.

In this case, the cell connectors 132 and the contact elements 140 of the connector assembly 164 are respectively fixed separately to the front holder frame 124, e.g. by clamping or latching by means of suitable clamping elements or latch elements.

The connecting webs 166, i.e. the frame web 170 and the individual connecting web sections 172, are then separated from the cell connectors 132 and the contact elements 140.

In a further step the front holder frame 124 is placed with the cell connectors 132 held thereon and the contact elements 140 held thereon onto the electrochemical cells 104 of the module 102 such that the front ends of the electrochemical cells 104 pass through the respectively associated passages 126 in the front holder frame 124 and the cell connectors 132 and also the contact elements 140 are positioned in the desired allocation to the electrochemical cells 104 of the module 102.

The contact sections 154 and 156 of the cell connectors 132 as well as the contact elements 140 of the electrical connections 138 are then connected, preferably integrally, to the respectively associated cell terminal 116.

For completion of the electrochemical module 102, the mounting 148 in the form of the circuit board 150 is then arranged on the front side of the electrochemical module 102 and connected to the holding webs 158, 160 or 146 (preferably by soldering), so that the final assembled state of the electrochemical module 102 represented in FIG. 2 is finally reached.

In this variant for assembly of the cell connectors 132 and the contact elements 140 on the cell terminals 116 the front holder frame 124 therefore serves as a mounting, on which the cell connectors 132 and the contact elements 140 are respectively fixed separately before the connecting webs 166 of the connector assembly 164 are detached.

Figure 11:
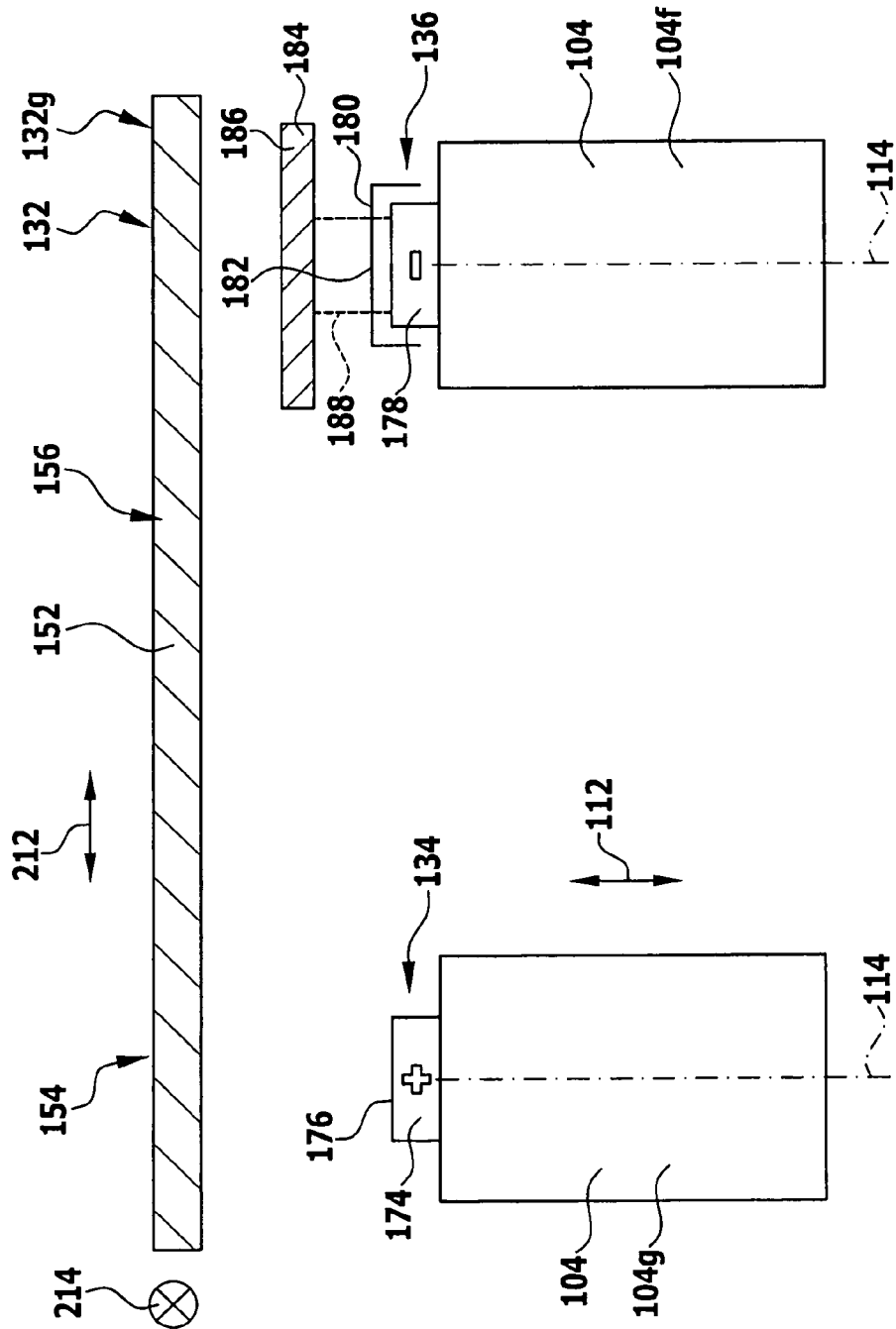
FIG. 11 is a schematic sectional view through two electrochemical cells and a cell connector with a base body, which is welded directly to a first cell terminal and is welded indirectly to a second cell terminal by means of a contact region, wherein the contact region is connected to the base body by ultrasonic welding.

Different possibilities for integrally connecting a cell connector 132 to the associated first cell terminal 134 and the associated second cell terminal 136 are described below with reference to FIGS. 11 to 13:

As may be seen in FIG. 11, for example, the (positive) first cell terminal 134 of an electrochemical cell 104g comprises a base body 174 made of an electrically conductive, preferably metallic, first material, e.g. aluminium or an aluminium alloy, wherein the first base body 174 has a first contact face 176 associated with the cell connector 132 made of the first material.

The second cell terminal 136 of the electrochemical cell 104f to be connected to the first cell terminal 134 by means of the cell connector 132 comprises a second base body 178 made of an electrically conductive, preferably metallic, material at risk of corrosion, e.g. of a low-alloy steel material, wherein the second base body 178 is provided with an anti-corrosive layer 180 of a second material, e.g. nickel or a nickel alloy, which at the same time forms a first anti-corrosive material.

The anti-corrosive layer 180 has a second contact face 182 facing the cell connector 132 and made of a second material or first anti-corrosive material.

The base body 152 of the cell connector 132 is preferably formed from the first material, i.e. from the same material as the first base body 174 of the first cell terminal 134.

In addition, in this embodiment the cell connector 132 comprises a contact region 184 connected to the base body 152 and made from a third material, which at the same time forms a second anti-corrosive material.

The contact region 184 of the cell connector 132 is preferably configured as a contact body 186 produced separately from the base body 152 and in the region of the second contact section 156 of the base body 152 is fixed, preferably integrally, to the side of the base body 152 facing the cell terminal 134, 136.

In the embodiment represented in FIG. 11 it is provided in particular that the contact region 184 is fixed to the base body 152 by means of ultrasonic welding.

In particular, the third material or the second anti-corrosive material, from which the contact region 184 is formed, can be substantially the same as the second material or the first anti-corrosive material, from which the anti-corrosive layer 180 of the second cell terminal 136 is formed.

For example, it can be provided that the third material or the second anti-corrosive material is nickel or a nickel alloy.

Alternatively hereto, it can also be provided that the third material or the second anti-corrosive material is a chromium alloy.

During the assembly of the electrochemical module 102 the base body 152 of the cell connector 132 is connected to the first cell terminal 134, preferably by laser welding, after the cell connector 132 has been positioned in the desired manner relative to the two cell terminals 134, 136.

The contact region 184 of the cell connector 132 is welded to the second cell terminal 136 by means of a weld, which is indicated by the broken line 188 in FIG. 11, wherein the weld 188 is preferably formed by laser welding. While during this welding process the anti-corrosive layer 180 of the second cell terminal 136 is melted and thus at least partially breached, so much of the second anti-corrosive material passes out of the contact region 184 containing the second anti-corrosive material into the structure and in particular onto the free surface of the weld 188 during the welding process that after conclusion of the welding process the weld 188 is formed from an anti-corrosive material at least on its free surface, but preferably in its entire structure.

This anti-corrosive material is predominantly composed of the material at risk of corrosion of the second base body 178 and the second anti-corrosive material originating from the contact region 184 of the cell connector 132, by means of which the material at risk of corrosion is alloyed to an anti-corrosive material.

The anti-corrosive action of the first anti-corrosive material and/or the second anti-corrosive material can be based in particular on the first anti-corrosive material and/or the second anti-corrosive material containing at least one anti-corrosive metal in a proportion of at least 50 per cent by weight.

It can be provided in particular that the first anti-corrosive material and/or the second anti-corrosive material contains nickel as anti-corrosive metal.

Alternatively or additionally hereto, it can be provided that the first anti-corrosive material and/or the second anti-corrosive material contains chromium as anti-corrosive metal.

The first anti-corrosive material and/or the second anti-corrosive material can contain both nickel and chromium as anti-corrosive metal, wherein it is then sufficient if the total proportion of both anti-corrosive metals for the first anti-corrosive material or the second anti-corrosive material amounts to at least 50 per cent by weight.

The corrosion resistance of the anti-corrosive material on the free surface of the formed weld 188 is preferably tested by a neutral salt spray test (NSS test) in accordance with standard DIN EN ISO 9227 (status July 2006). Reference is made to said standard with respect to the procedure of such a neutral salt spray test and on this basis said standard is incorporated into the present description.

Figure 47:
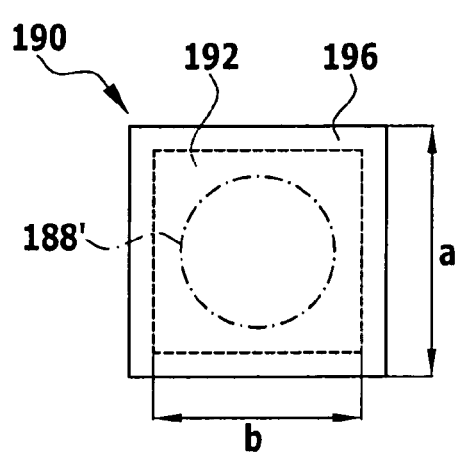
FIG. 47 is a schematic plan view onto a sample body for determination of the corrosion resistance of a weld between a cell terminal and a cell connector.
Figure 48:
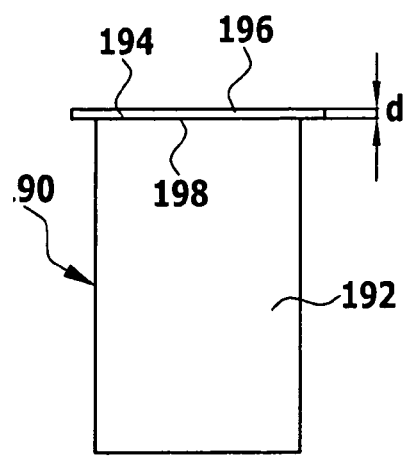
FIG. 48 is a schematic side view of the sample body from FIG. 47.
Figure 49:
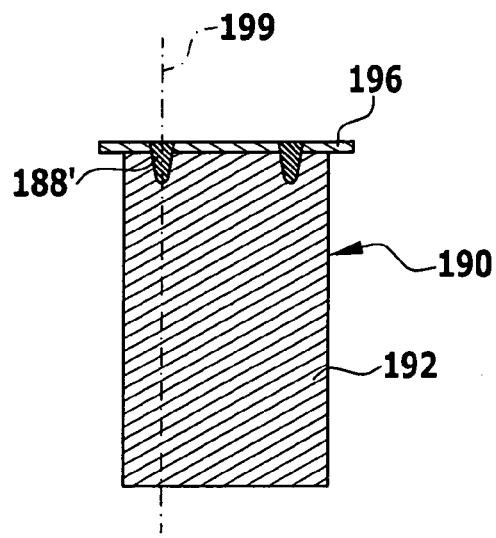
FIG. 49 is a schematic view in longitudinal section through the sample body from FIGS. 47 and 48.

For conducting the salt spray test a sample body 190 of the type represented in FIGS. 47 to 49 is produced.

The sample body 190 comprises a cuboidal base 192 with a square face 194, which has an edge length b of 12 mm, for example.

The base 192 is made of the material at risk of corrosion of the second base body 178 of the second cell terminal 136, i.e. from the low-alloy steel material, for example, which is provided on its surface with the anti-corrosive layer composed of the first anti-corrosive material, e.g. nickel or a nickel alloy.

A quadrilateral coating 196, which has a square face 198 directed towards the base 192 with an edge length a of 15 mm, for example, and a thickness d of 0.5 mm, for example, is placed on the face 194 and is connected to the second cell terminal 136 by means of welding along a weld 188' closed in a ring shape, in particular by means of a laser weld, under the same conditions as in the welding of the cell connector 132.

The sample body 190 thus produced is subjected to the neutral salt spray test (NSS test) in a spray chamber for a test period of 96 hours in accordance with DIN EN ISO 9227 (status July 2006).

After conclusion of the neutral salt spray test a visual assessment of the surface of the sample body 190, in particular the weld 188', and a visual assessment of a ground section along a cutting plane 199 running through the weld 188' in the axial direction of the sample body 190 (see FIG. 49) are made.

In the visual assessment the material of the tested weld 188' is assigned a rating in accordance with the following assessment overview:
 rating 1: no change, no discolouration, no corrosion;
 rating 2: discolouration or colour change, but no corrosion;
 rating 3: traces of corrosion, only few small dot-shaped areas;
 rating 4: light corrosion with a plurality of small dot-shaped areas, but without cohesive corroded regions;
 rating 5: moderate corrosion, cohesive corroded regions;
 rating 6: heavy corrosion, sample completely corroded.

To be classed as anti-corrosive, the material of the sample body, in particular the weld 188' of the sample body 190, must have been assessed according to the neutral salt spray test (NSS test) with a maximum rating of 3.

The rating determined by the neutral salt spray test on the weld 188' of the sample body 190 is assigned to the material of the weld 188 between the second cell terminal 136 and the contact region 184 of the cell connector 132.

Alternatively to using a contact body 186 produced separately from the base body 152 of the cell connector 132 and then connected integrally to the base body 152, a contact region 184 can be used that comprises a coating generated on the base body 152, in particular an electroplated coating, composed of the second anti-corrosive material.

The base body 152 of the cell connector 132 is preferably formed from aluminium or an aluminium alloy. The proportion of aluminium in the material of the base body 152 preferably amounts to at least 99.5 per cent by weight.

In order to reduce mechanical stresses that can occur as a result of different thermal expansions of the cell connectors 132, on the one hand, and the receiving device 108 for the electrochemical cells 104, on the other hand, as far as possible during operation of the electrochemical device 100, it is favourable if the material of the base body 152 of the cell connector 132 has a coefficient of thermal expansion α that differs by less than 10% from the coefficient of thermal expansion α of the material of the receiving device 108.

If the coefficients of thermal expansion of these materials vary significantly from ambient temperature to the operating temperature of the electrochemical device 100, then this given detail relates to the respective average coefficient of thermal expansion in the case of an increase in temperature from ambient temperature (20° C.) to the operating temperature of the electrochemical device 100.

Therefore, it is particularly favourable if the base body 152 and the receiving device 108 are formed from substantially the same material, i.e. both from aluminium or an aluminium alloy, for example.

Figure 12:
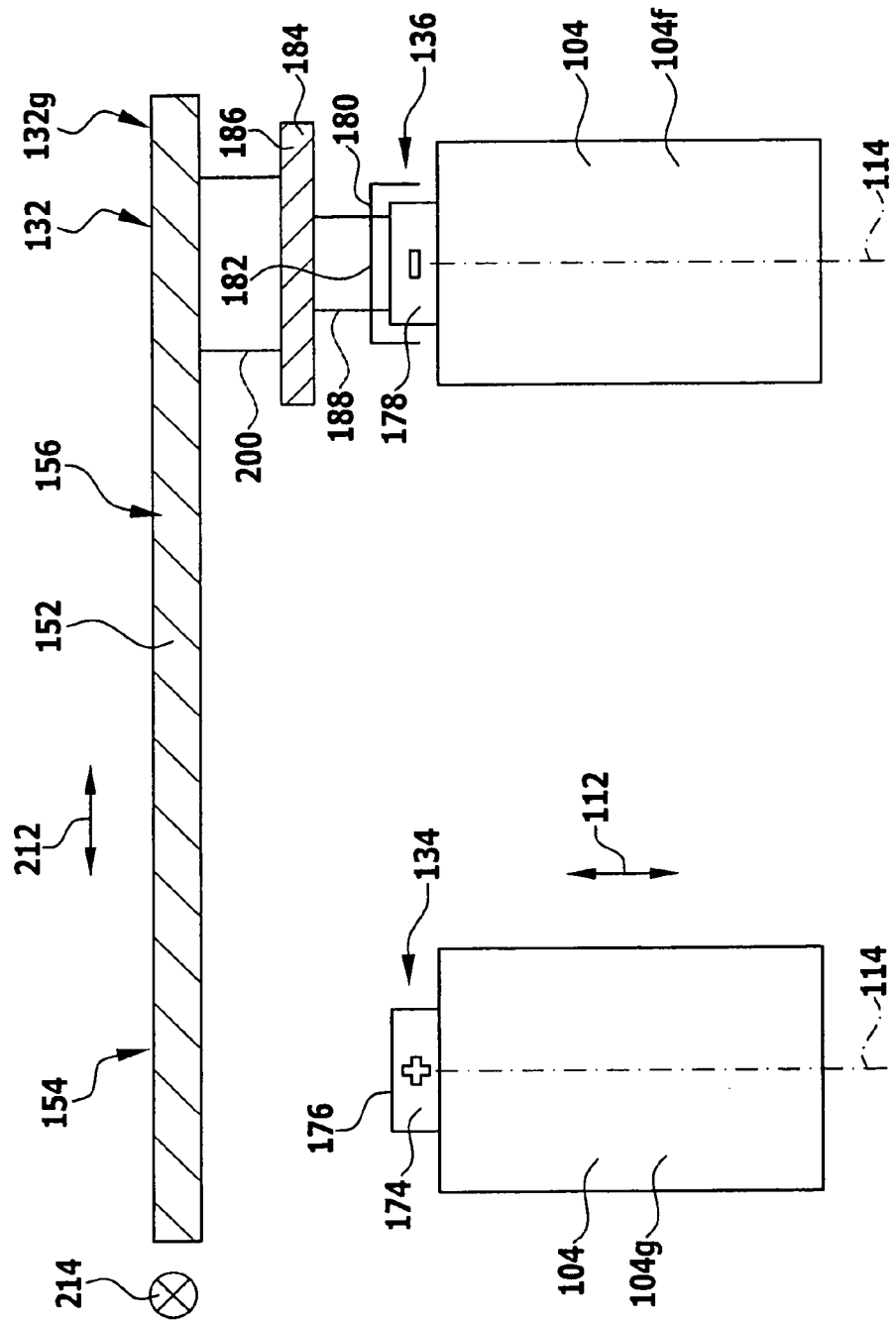
FIG. 12 is a schematic sectional view through two electrochemical cells and a cell connector, which is welded directly to a first cell terminal and indirectly to a second cell terminal by means of a contact region, wherein the contact region is connected to the base body by laser welding along a weld.

In an alternative possibility for the integral connection of the cell connector 132 to the first cell terminal 134 and the second cell terminal 136 shown schematically in FIG. 12, the contact region 184 configured as contact body 186 produced separately from the base body 152 of the cell connector 132 is not fixed to the base body 152 by ultrasonic welding but by laser welding along a weld indicated by the line 200 in FIG. 12.

Otherwise, the possibility for integral connection of the cell connector 132 to the cell terminals 134 and 136 shown in FIG. 12 is the same with respect to structure, function and method of production as the possibility shown in FIG. 11, and on this basis reference is made to the above description thereof.

Figure 13:
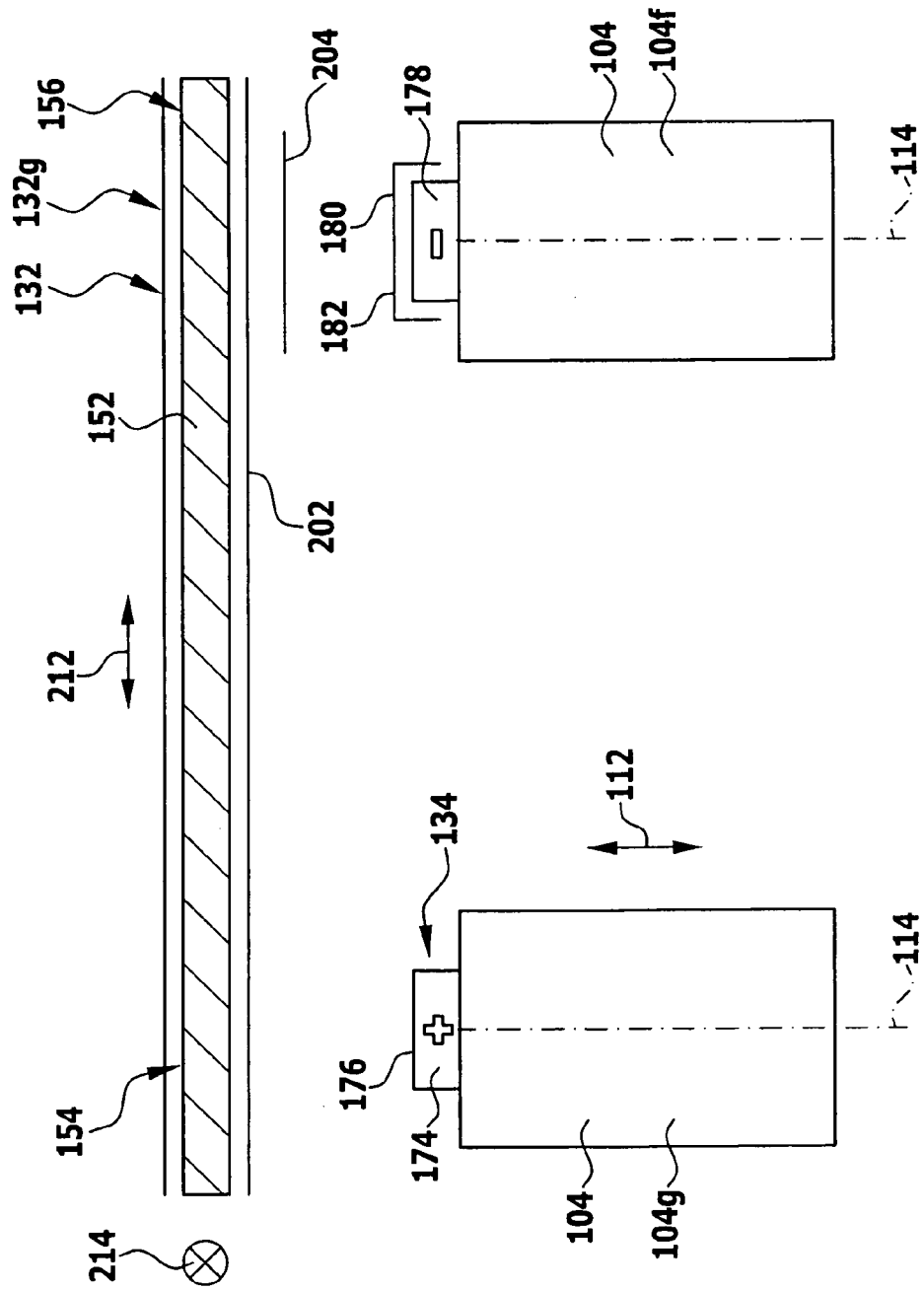
FIG. 13 is a schematic sectional view through two electrochemical cells and a cell connector, which is connected to a first cell terminal by welding and is connected to a second cell terminal by soldering.

An alternative possibility for integral connection of the cell connector 132 to the cell terminals 134 and 136 shown schematically in FIG. 13 differs from the possibility shown in FIGS. 11 and 12 in that the cell connector 132 is not welded to the second cell terminal 136, but instead is connected to the second cell terminal 136 by means of soldering.

Moreover, in this embodiment the contact region 184 made of the third material or the second anti-corrosive material is not formed by a contact body 186 produced separately from the base body 152 and then integrally connected to the base body 152, but by a coating 202, e.g. of nickel or a nickel alloy, arranged on the base body 152.

In this case, the coating 202 extends at least over the side of the second contact section 156 of the base body 152 facing the second cell terminal 136 in the assembled state of the electrochemical module 102.

However, as can be seen from FIG. 13, the coating 202 can, moreover, also extend over the same side of the first contact section 154 and/or over the side of the base body 152 remote from the cell terminals 134 and 136 in the assembled state.

The soldering of the contact region 184 in the form of the coating 202 to the second cell terminal 136 can be performed, for example, by means of a solder foil 204 composed of a soft solder, in particular from a lead-free soft solder, e.g. from the solder with the composition $SnAg_{3.5}$.

Soldering by means of a soft solder with a low soldering temperature (of less than approximately 250° C.) provides the advantage that thermally sensitive components of the electrochemical module 102, in particular insulation points made of plastic material, are not damaged during assembly of the cell connector 132.

Alternatively to using a soft solder, a hard solder, e.g. a silver-based hard solder, can be used, wherein for soldering the hard solder is preferably melted by means of a short-time laser to avoid damage of thermally sensitive components of the electrochemical module 102.

That coating 202 that forms the contact region 184 of the cell connector 132 can in particular be an electroplated coating.

Alternatively to soldering the contact region 184 of the cell connector 132 to the cell terminal 136, these elements can also be adhered to one another by means of an electrically conductive adhesive.

In particular, an epoxy resin adhesive with an electrically conductive filler can be used for gluing.

In particular, the electrically conductive filler can comprise silver.

The electrically conductive adhesive can be respectively applied to one of the elements to be adhered to one another or to both elements, whereupon both elements are brought in contact with the adhesive layer and the adhesive layer is cured.

The curing of the adhesive layer can occur in particular by supplying heat at a temperature higher than room temperature.

The two elements to be adhered to one another are preferably pressed against one another under a contact pressure until these elements are integrally connected to one another by the adhesive.

Suitable electrically conductive adhesives are in particular the following:

- the epoxy adhesive containing silver available under the name LOCTITE® 3880 from Henkel Technologies, Heydastraβe 10, 58093 Hagen, Germany. Reference is made to the technical data sheet for the adhesive LOCTITE® 3880 of June 2005 with respect to the chemical and physical properties and working steps for processing this adhesive, and the said data sheet is incorporated into the present description in this regard;
- the epoxy resin adhesive containing silver available under the name Master Bond Supreme 10HT/S from Master Bond Inc., 154 Hobart Street, Hackensack, N.J. 07601-3922, USA. Reference is made to the technical data sheet for the adhesive Master Bond Supreme 10HT/S with respect to the chemical and physical properties and working steps for processing this adhesive, and the said data sheet is incorporated into the present description in this regard;
- the epoxy resin adhesive containing silver available under the name Master Bond FL901S from Master Bond Inc., 154 Hobart Street, Hackensack, N.J. 07601-3922, USA. Reference is made to the technical data sheet for the adhesive Master Bond FL901S with respect to the chemical and physical properties and working steps for processing this adhesive, and the said data sheet is incorporated into the present description in this regard.

During operation of the electrochemical device 100, as a result of different temperatures and/or as a result of different coefficients of thermal expansion of the cell connectors 132, on the one hand, and the receiving device 108 for the electrochemical cells 104, on the other hand, a difference can occur between a longitudinal expansion of the cell connectors 132, on the one hand, and a change in spacing between the longitudinal axes 114 of the cell terminals 134, 136 connected to one another by the cell connectors 132, on the other hand. As a result of a temperature change, the relative positions of the terminals 134, 136 connected to one another by means of a cell connector 132 are changed in the transverse directions 120 or 122 of the module 102 oriented perpendicularly to the axial direction 112 of the electrochemical cells 104.

Moreover, as a result of different longitudinal expansions of the electrochemical cells 104 connected to one another by a cell connector 132, a change of the relative positions between the cell terminals 134 and 136 connected to one another can occur in the axial direction 112 of the electrochemical cells 104 connected to one another.

To be able to compensate such differences between a longitudinal expansion of the cell connector 132, on the one hand, and a change in the spacing between the longitudinal axes 114 of the cell terminals 134 and 136 connected to one another by the cell connector 132, on the other hand, and/or such differences between a longitudinal expansion of a first electrochemical cell (104g, for example) and a second electrochemical cell (104f, for example), which are connected to one another by the cell connector 132, it is provided in the alternative embodiments of cell connectors 132 shown in FIGS. 14 to 37 that the respective cell connector 132 comprises an elastically and/or plastically deformable compensation region 206, which is arranged between the first contact section 154 and the second contact section 156 of the cell connector 132 and connects the two contact sections 154 and 156 to one another.

The base body 152 of the cell connector 132 is preferably provided with such a compensation region 206.

In the embodiment of a cell connector 132 shown in FIGS. 14 and 15, the deformable compensation region 206 has an undulating structure, wherein the undulating structure comprises a plurality of undulations with an amplitude directed parallel to the axial direction 112 of the cells 104 to be connected by means of the cell connector 132 and substantially perpendicular to the contact faces 208 and 210, with which the cell connector 132 abuts against the first cell terminal 134 or against the second cell terminal 136 in the assembled state. These undulations have a plurality of, e.g. four, wave peaks running transversely, preferably substantially perpendicularly, to the axial direction of the electrochemical cells 104 and transversely, preferably substantially perpendicularly, to a longitudinal direction 212 of the cell connector 132 as well as substantially parallel to a transverse direction 214 of the cell connector 132, which is oriented perpendicularly to the longitudinal direction 212 of the cell connector 132 and perpendicularly to the axial direction 112 of the electrochemical cells 104, and a plurality of wave troughs 218 arranged between the wave peaks 216 and running transversely, preferably substantially perpendicularly, to the axial direction 112 of the electrochemical cells 104 and transversely, preferably substantially perpendicularly, to the longitudinal direction 212 of the cell connector 132 and substantially parallel to the transverse direction 214 of the cell connector 132.

The wave peaks 216 project upwards in a contact direction 217 of the cell connector 132 perpendicular to the contact faces 208 and 210 of the cell connector 132, which in the assembled state of the cell connector 132 is the same as the axial direction 112 of the cells 104, whereas the wave troughs 218 project downwards in the contact direction 217 (towards the cells 104 to be connected).

As in the embodiment of a cell connector 132 shown in FIGS. 1 to 4, which is substantially planar in the region between the contact sections 154 and 156, the embodiment of a cell connector 132 shown in FIGS. 14 and 15, which comprises a deformable compensation region 206 between the two contact sections 154 and 156, has two holding webs 158 and 160, by means of which the cell connector 132 is connectable to the mounting 148 and which can serve to connect the cell connector 132 electrically conductively to a track connecting to the control unit of the electrochemical device 100, so that the holding webs 158 and 160 are also usable in particular as voltage taps 162.

In this case, each of the holding webs 158 and 160 can be provided with a respective bend 220 to bridge a height difference between the position of the cell connector 132 and the position of the mounting 148 in the axial direction 112 of the electrochemical cells 104.

As a result of the undulating structure of the deformable compensation region 206 of the cell connector 132, the compensation region 206 is easily elastically and/or plastically deformable in such a manner that the second contact section 156 can be displaced relative to the first contact section 154 both in the axial direction 112 of the electrochemical cells 104 and in the longitudinal direction 212 of the cell connector 132 to compensate the above-described differences in the relative positions of the cell terminals 134 and 136 to be connected to one another by means of the cell connector 132. As a result, excessive mechanical stresses at the connection points between the cell connector 132, on the one hand, and the first cell terminal 134 as well as the second cell terminal 136, on the other hand, can be prevented from occurring.

In particular, by making the wave peaks 216 and the wave troughs 218 flatter or steeper, the expansion of the compensation region 206 in the longitudinal direction 212 of the cell connector 132 can be changed and thus the spacing between the first contact section 154 and the second contact section 156 can be increased or decreased respectively.

As a result of the asymmetric change in the flank inclinations of the wave peaks 216 and the wave troughs 218, the first contact section 154 and the second contact section 156 can be displaced relative to one another in the axial direction 112 of the electrochemical cells to be connected to one another.

The mechanical stresses occurring at these connection points during operation of the electrochemical device 100 can be further reduced if the deformable compensation region 206 of the cell connector 132 is formed from a material with a relatively low yield point R of 60 N/mm² at most, preferably of 40 N/mm² at most, in particular of 20 N/mm² at most.

Moreover, to reduce the mechanical stresses occurring at the connection points between the cell connector 132 and the cell terminals 134 and 136 to be connected to one another, it can be provided that the cell connector 132 is already deformed, preferably plastically, before connection to the first cell terminal 134 and/or before connection to the second cell terminal 136 in such a manner that the first contact section 154 of the cell connector 132 to be connected to the first cell terminal 134 and the second contact section 156 of the cell connector 132 to be connected to the second cell terminal 136 are displaced relative to one another such that differences in the positions of the first cell terminal 134 and the second cell terminal 136 in the axial direction 112 of the electrochemical cells 104 to be connected to one another, which can be caused by manufacturing tolerances, for example, can be compensated at least partially, preferably substantially completely.

It is particularly favourable in this case if before the corresponding deformation of the cell connector 132 the relative positions of the first cell terminal 134 and the second cell terminal 136, which are to be connected to one another by the cell connector 132, are measured.

Moreover, the yield point of the material of the cell connector 132 in the compensation region 206 and/or in the first contact section 154 and/or in the second contact section 156 can be reduced by a thermal treatment before and/or during the integral connection of the cell connector 132 to the first cell terminal 134 and/or to the second cell terminal 136. As a result of such a reduction of the yield point of the material by means of a thermal treatment, the mechanical stresses can be reduced during and/or after the integral connection of the cell connector 132 to the first cell terminal 134 or to the second cell terminal 136.

Otherwise, the embodiment of a cell connector 132 shown in FIGS. 14 to 16 is the same with respect to structure, function and method of production as the above-described embodiments of cell connectors 132 without deformable compensation region, and on this basis reference is made to the above description thereof.

An alternative embodiment of a cell connector 132 shown in FIGS. 17 and 18 differs from the embodiment shown in FIGS. 14 to 16 in that the undulating structure of the deformable compensation region 206 has only three wave peaks 216 instead of four running in the transverse direction 214 of the cell connector 132 and has only two wave troughs 218 running in the transverse direction instead of three.

Moreover, this embodiment of a cell connector 132 has no holding webs 158, 160 for connecting the cell connector 132 to the mounting 148.

Therefore, such a cell connector 132 is only held on the electrochemical module 102 by the integral connection to the cell terminals 134 and 136.

However, this embodiment of a cell connector 132 and all embodiments of cell connectors 132 described below, which are shown without holding webs 158, 160, can in principle also be provided with one or more holding webs 158 or 160, which can also serve in particular as voltage taps 162.

Otherwise, the embodiment of a cell connector 132 shown in FIGS. 17 and 18 is the same with respect to structure, function and method of production as the embodiment shown in FIGS. 14 to 16, and on this basis reference is made to the above description thereof.

An alternative embodiment of a cell connector 132 shown in FIGS. 19 and 20 differs from the embodiment shown in FIGS. 14 to 16 in that instead of an undulating structure the deformable compensation region 206 has a half-bead structure, which has two bead crests 222 running in the transverse direction 214 of the cell connector 132 and merges into the first contact section 154 at a first bending line 224 and into the second contact section 154 of the cell connector 132 at a second bending line 226.

Otherwise, the embodiment of a cell connector 132 shown in FIGS. 19 and 20 is the same with respect to structure, function and method of production as the embodiment shown in FIGS. 14 to 16, and on this basis reference is made to the above description thereof.

An alternative embodiment of a cell connector 132 shown in FIGS. 21 and 22 differs from the embodiment shown in FIGS. 14 to 16 in that the deformable compensation region 206 has an undulating structure, which comprises only one wave peak 216 extending in the transverse direction 214 of the cell connector 132 and only one wave trough 218 extending in the transverse direction 214 of the cell connector 132.

Otherwise, the embodiment of a cell connector 132 shown in FIGS. 21 and 22 is the same with respect to structure, function and method of production as the embodiment shown in FIGS. 14 to 16, and on this basis reference is made to the above description thereof.

An alternative embodiment of a cell connector 132 shown in FIGS. 23 and 24 differs from the embodiment shown in FIGS. 14 to 16 in that the deformable compensation region 206 has an undulating structure, which comprises two wave peaks 216 running in the transverse direction 214 of the cell connector 132 and one wave trough 218 running between the wave peaks 216 in the transverse direction 214 of the cell connector 132.

Otherwise, the embodiment of a cell connector 132 shown in FIGS. 23 and 24 is the same with respect to structure, function and method of production as the embodiment shown in FIGS. 14 to 16, and on this basis reference is made to the above description thereof.

An alternative embodiment of a cell connector 132 shown in FIGS. 25 and 26 differs from the embodiment shown in FIGS. 14 to 16 in that the deformable compensation region 206 has a zigzag structure, which has a plurality of, e.g. five, bending lines 228 running transversely, preferably substantially perpendicularly, to the axial direction 112 of the electrochemical cells 103 to be connected to one another and running substantially in the transverse direction 214 of the cell connector 132.

Otherwise, the embodiment of a cell connector 132 shown in FIGS. 25 and 26 is the same with respect to structure, function and method of production as the embodiment shown in FIGS. 14 to 16, and on this basis reference is made to the above description thereof.

An alternative embodiment of a cell connector 132 shown in FIGS. 27 and 28 differs from the embodiment shown in FIGS. 17 and 18 in that the cell connector 132 does not have a contact region 184 made of the third material or the second anti-corrosive material arranged on the second contact section 156.

However, in principle, every embodiment of a cell connector 132 represented in this description and the attached drawings without such a contact region 184 can be provided with such a contact region 184.

Otherwise, the embodiment of a cell connector 132 shown in FIGS. 27 and 28 is the same with respect to structure, function and method of production as the embodiment shown in FIGS. 17 and 18, and on this basis reference is made to the above description thereof.

An alternative embodiment of a cell connector 132 shown in FIGS. 29 and 30 differs from the embodiment shown in FIGS. 14 to 16 in that the cell connector 132 does not have any holding webs 158, 160 for connecting the cell connector 132 to a mounting 148.

Therefore, in the assembled state this cell connector 132 is only held on the electrochemical module 102 by the integral connection to the first cell terminal 134 and the second cell terminal 136.

Otherwise, the embodiment of a cell connector 132 shown in FIGS. 29 and 30 is the same with respect to structure, function and method of production as the embodiment shown in FIGS. 14 to 16, and on this basis reference is made to the above description thereof.

Figure 33:
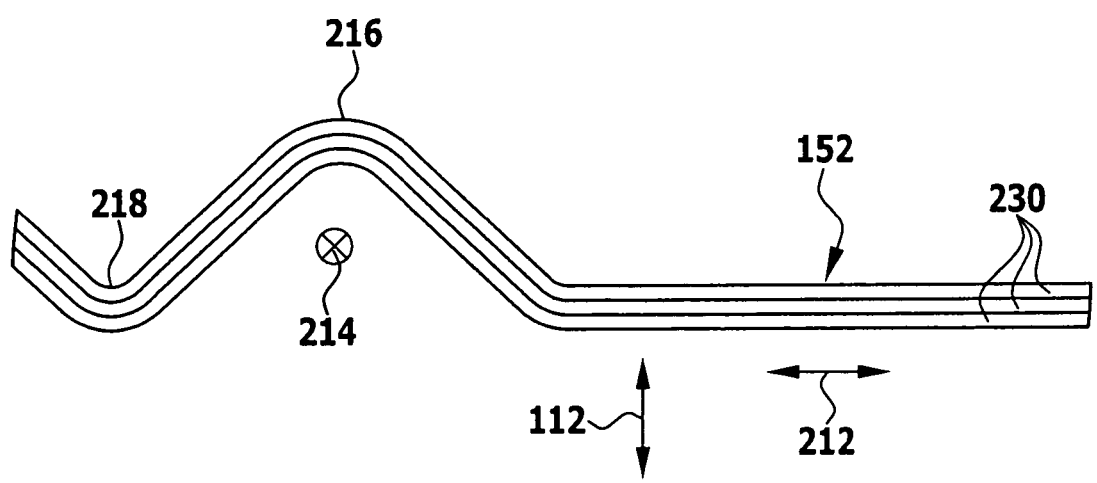
FIG. 33 is an enlarged representation of area A from FIG. 32.

An alternative embodiment of a cell connector 132 shown in FIGS. 31 to 33 differs from the embodiment shown in FIGS. 27 and 28 in that the base body 152 of the cell connector 132 is not configured in one piece, but as a laminate composed of a plurality of, e.g. three, superposed material layers 230.

The structure allowing the elastic and/or plastic deformation of the compensation region 206, in particular its undulating structure, is retained in this case.

The base body 152 can also comprise such a laminate in all the other embodiments of cell connectors 132 disclosed in this description and the attached drawings.

Otherwise, the embodiment of a cell connector 132 shown in FIGS. 31 to 33 is the same with respect to structure, function and method of production as the embodiment shown in FIGS. 27 and 28, and on this basis reference is made to the above description thereof.

An alternative embodiment of a cell connector 132 shown in FIGS. 34 and 35 differs from the embodiment shown in FIGS. 27 and 28 in that the deformable compensation region 206 is divided by a plurality of, e.g. three, undulating slits 232 into a plurality of, e.g. four, undulating webs 234, which are arranged adjacent to one another in the transverse direction 214 of the cell connector 132.

In this case, the undulation of the slits 232 and the webs 234 has an amplitude in the transverse direction 214 of the cell connector 132.

In addition, the cell connector 132 can be respectively provided with a plurality of, e.g. respectively three or four, e.g. approximately segment-shaped recesses 236 on the side edges of the deformable compensation region 206 so that the externally located webs 234 also have an approximately constant width over their longitudinal extent and also have an approximate undulation on their outer surface.

As a result of the slits 232 and the division of the compensation region 206 into a plurality of webs 234, the deformability of the compensation region 206 is increased and the generation of a displacement between the contact sections 154 and 156 of the cell connector 132 is simplified.

Otherwise, the embodiment of a cell connector 132 shown in FIGS. 34 and 35 is the same with respect to structure, function and method of production as the embodiment shown in FIGS. 27 and 28, and on this basis reference is made to the above description thereof.

Figure 36:
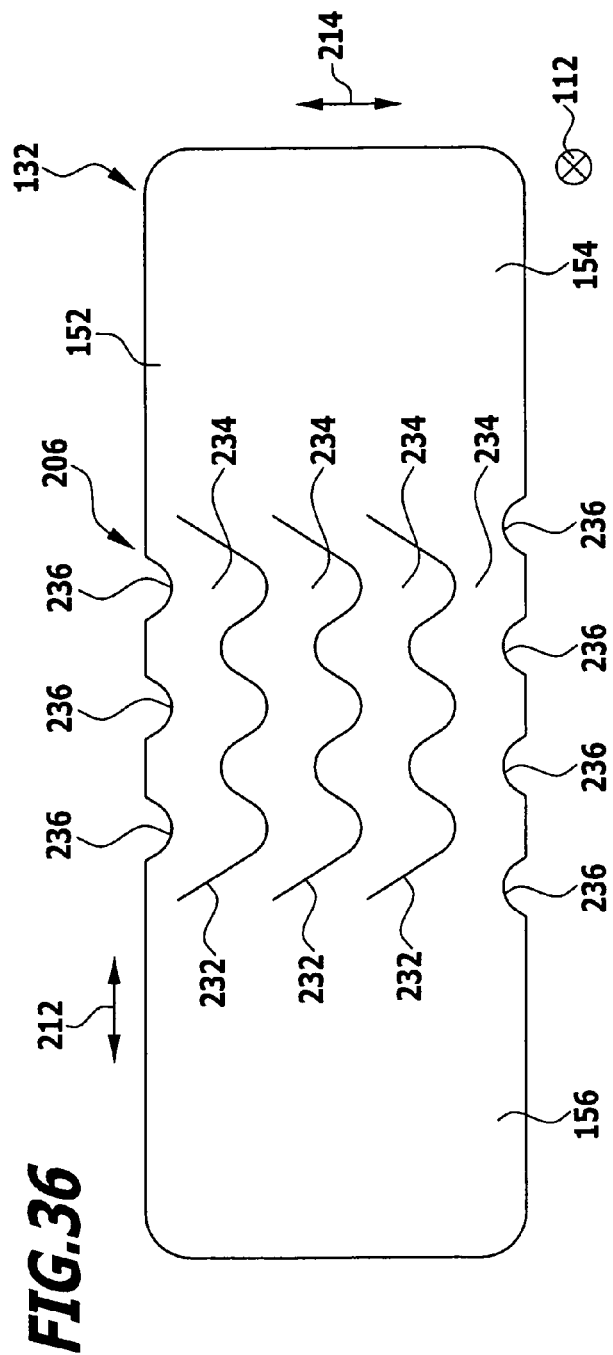
FIG. 36 is a schematic plan view onto an alternative embodiment of a cell connector with a deformable compensation region, which is substantially plane, but is divided by a plurality of, e.g. three, undulating slits into a plurality of, e.g. four, undulating webs, wherein the undulation of the slits and the undulation of the webs have an amplitude transversely to the axial direction of the electrochemical cells.
Figure 37:
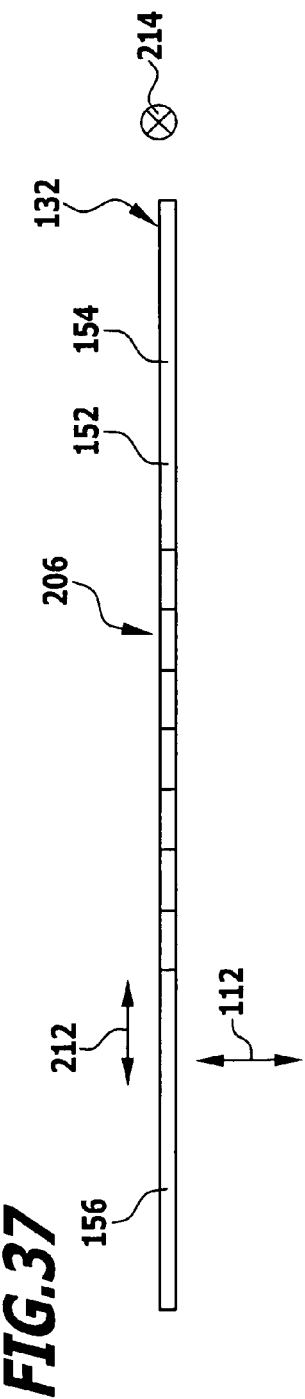
FIG. 37 is a schematic side view of the cell connector from FIG. 36.

An alternative embodiment of a cell connector 132 shown in FIGS. 36 and 37 differs from the embodiment shown in FIGS. 34 and 35 in that the deformable compensation region 206 is substantially planar and therefore has no undulating structure with an amplitude in the axial direction of the electrochemical cells 104 to be connected to one another.

In this embodiment of a cell connector 132 the elastic and/or plastic deformability of the compensation region 206 is caused exclusively by the undulating slits 232, which divide the compensation region 206 into a plurality of undulating webs 234, which are arranged adjacent to one another in the transverse direction 214 of the cell connector 132.

Otherwise, the embodiment of a cell connector 132 shown in FIGS. 36 and 37 is the same with respect to structure, function and method of production as the embodiment shown in FIGS. 34 and 35, and on this basis reference is made to the above description thereof.

All the described embodiments of cell connectors 132 can be respectively provided with at least one passage in the first contact section 154 and/or in the second contact section 156 and also possibly in the contact region 184 of the cell connector 132 to enable, for measurement purposes, an electrical connection of the first cell terminal 134 integrally connected to the cell connector 132 or the second cell terminal 136 integrally connected to the cell connector 132, which can be used for determination of the electrical transition resistance of the connection between the cell connector 132 and the respective cell terminal 134, 136.

In the embodiment of an electrochemical device 100 described above in particular with reference to FIG. 2, the cell connectors 132 and the electrical connections 138 of the electrochemical module 102 are connected to the tracks of a circuit board 150 by means of holding webs 158, 160 or 146, wherein the cell connectors 132 and the contact elements 140 of the electrical connections 138 were produced separately from the tracks of the circuit board 150 and were only electrically conductively connected to the tracks of the circuit board 150 during assembly of the electrochemical module 102.

Figure 38:
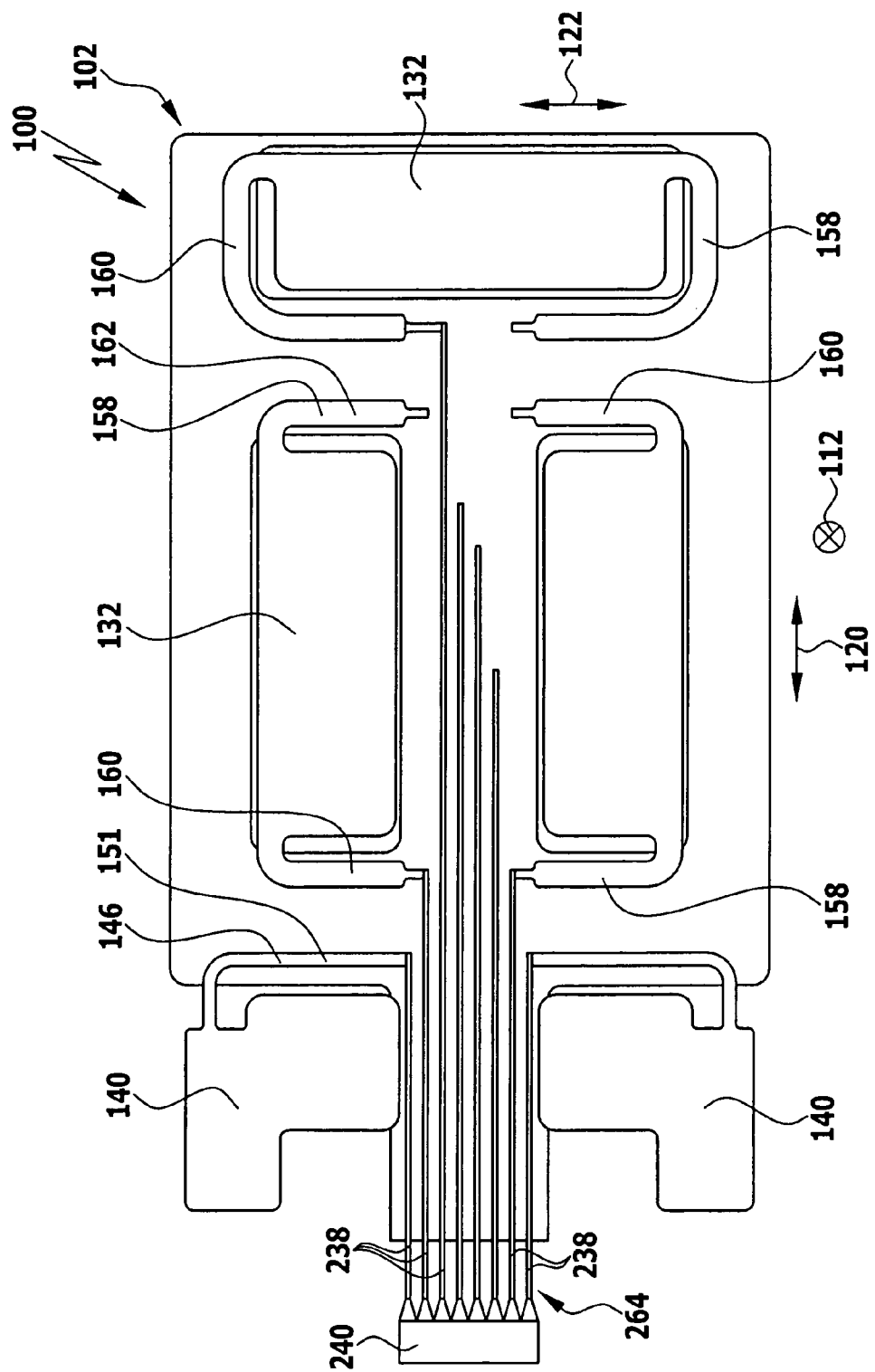
FIG. 38 is a schematic plan view onto a plurality of cell connectors, which are respectively configured in one piece with a respective track for a voltage tap of the cell connectors.
Figure 39:
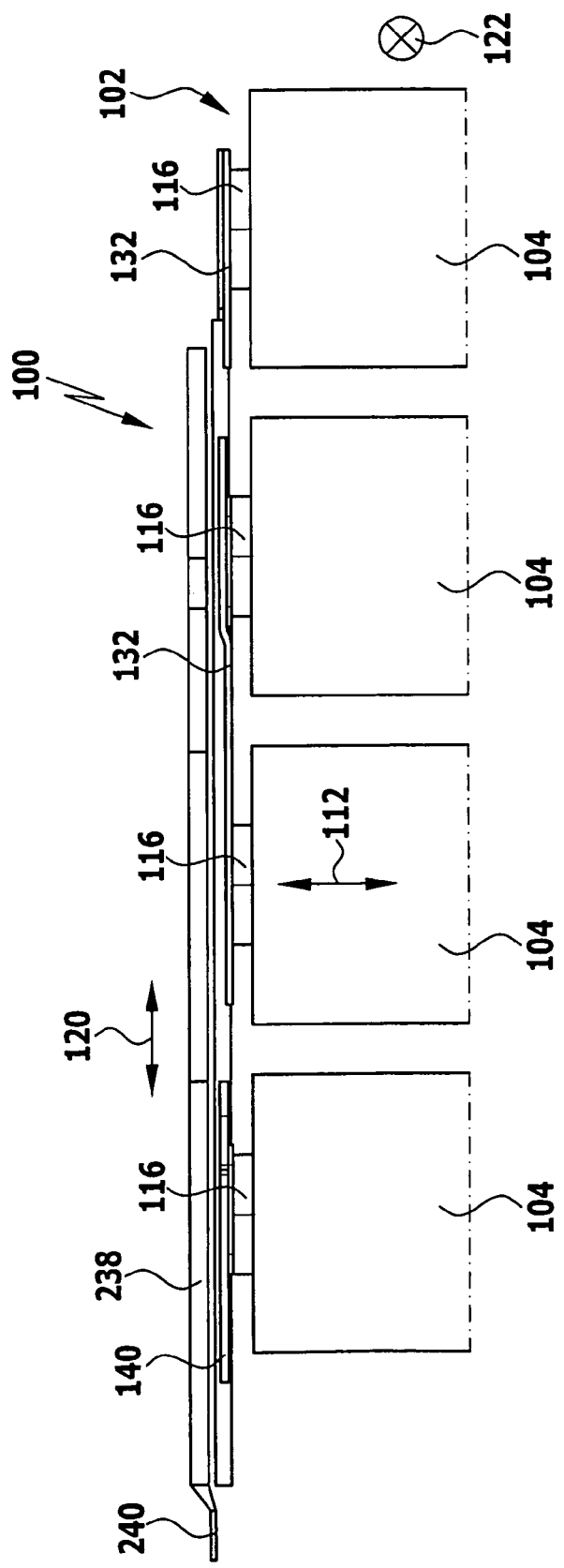
FIG. 39 is a schematic side view of the cell connector assembly from FIG. 38, wherein the cell connectors are arranged on the cell terminals of the electrochemical cells of the module.

However, in the alternative embodiment of an electrochemical device 100 shown in FIGS. 38 and 39, each cell connector 132 is configured in one piece with a respectively associated track 238.

The tracks 238 are not fixed to a circuit board, but are configured to be self-supporting.

In this embodiment the contact elements 140 of the electrical connections 138 of the electrochemical module 102 are also preferably configured in one piece with a respectively associated track 238.

The free ends of the tracks 238 remote from the cell connectors 132 are electrically conductively connected to a connecting web 240, which is replaceable by a plug of a correspondingly multicore cable connection, which connects to the control unit of the electrochemical device 100, so that the electric potentials of the cell connectors 132 can be tapped by the control unit in this way.

Figure 50:
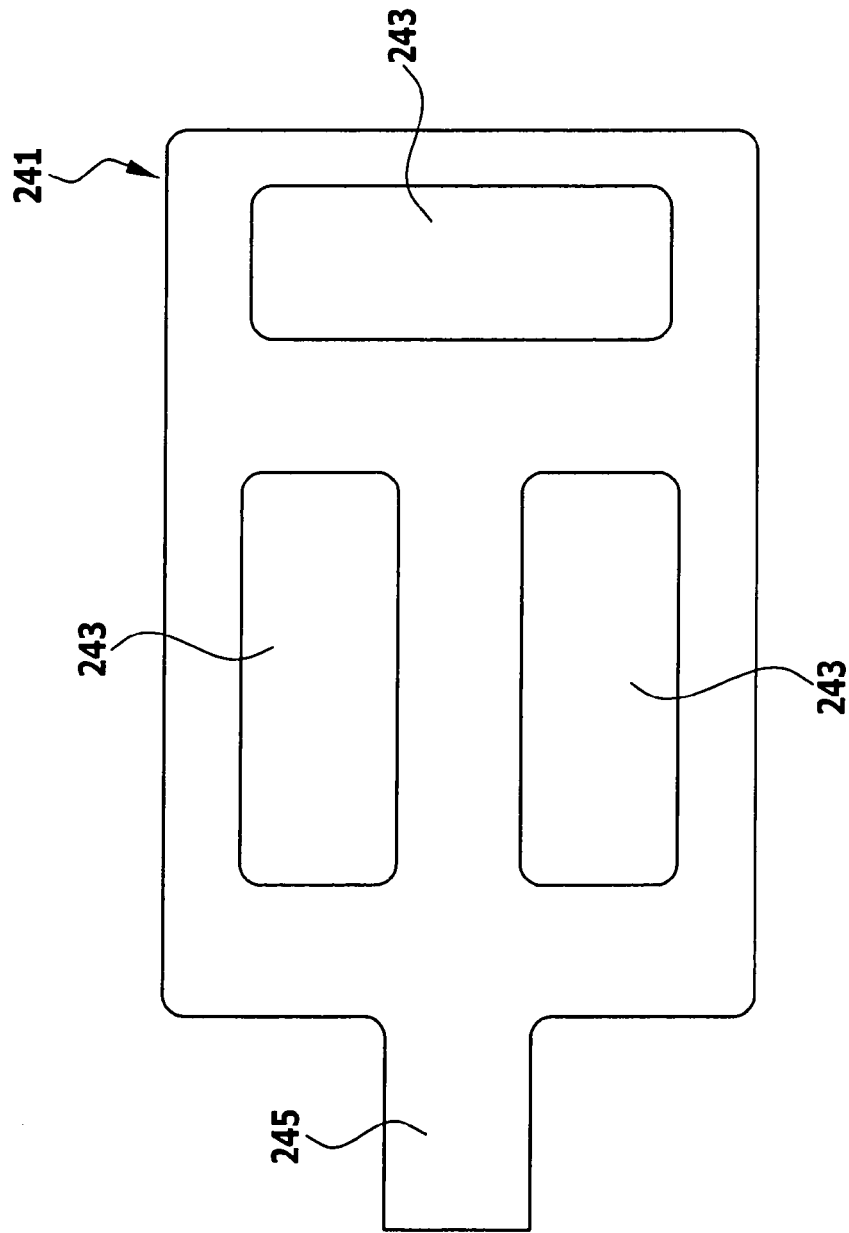
FIG. 50 is a schematic plan view onto an auxiliary frame for holding cell connectors.

In this embodiment, the cell connectors 132 are held on an auxiliary frame 241, which is formed from an electrically insulating material, e.g. a plastic material, and is shown separately in FIG. 50.

For each respective cell connector 132 the auxiliary frame 241 has an associated recess 243, which allows passage of the respective cell connector 132 to the cell terminals 134 and 136 to be connected to one another by means of the cell connector 132 and/or passage of the cell terminals 134 and 136 to be connected to one another by means of the cell connector 132 to the respective cell connector 132.

Moreover, the auxiliary frame 241 has a projection 245 with contact elements 140 arranged on both its sides (see FIG. 38).

The tracks 238 can be supported on the auxiliary frame 241.

The cell connectors 132 and/or the contact elements 140 can be fixed to the auxiliary frame 241 serving as mounting for the cell connectors 132 and the contact elements 140 by clamping or latching by means of suitable clamping elements or latch elements.

The auxiliary frame 241 enables the assembly comprising the cell connectors 132, the contact elements 140 and the associated tracks 238 of an electrochemical module 102 to be handled as a unit during assembly of the module 102, and thus simplifies assembly of the electrochemical module 102.

In the embodiment of the electrochemical device 100 show in FIGS. 38 and 39 it is provided that the cell connectors 132 and the contact elements 140 firstly form with the tracks 238 and the connecting web 240 a connector assembly 164 in one piece, in which the cell connectors 132 and the contact elements 140 are connected to one another in one piece by the tracks 238 and the connecting web 240, wherein the connecting web 240 is then removed when the cell connectors 132 and the contact elements 140 have been integrally connected to the respectively associated cell terminal 116 and/or to the auxiliary frame 241.

Otherwise, the embodiment of an electrochemical device 100 shown in FIGS. 38 and 39 is the same with respect to structure, function and method of production as the embodiment shown in FIGS. 1 to 4, and on this basis reference is made to the above description thereof.

Each of the above-described embodiments of an electrochemical device 100 can comprise a plurality of electrochemical modules 102, which are preferably electrically connected in series.

Figure 40:
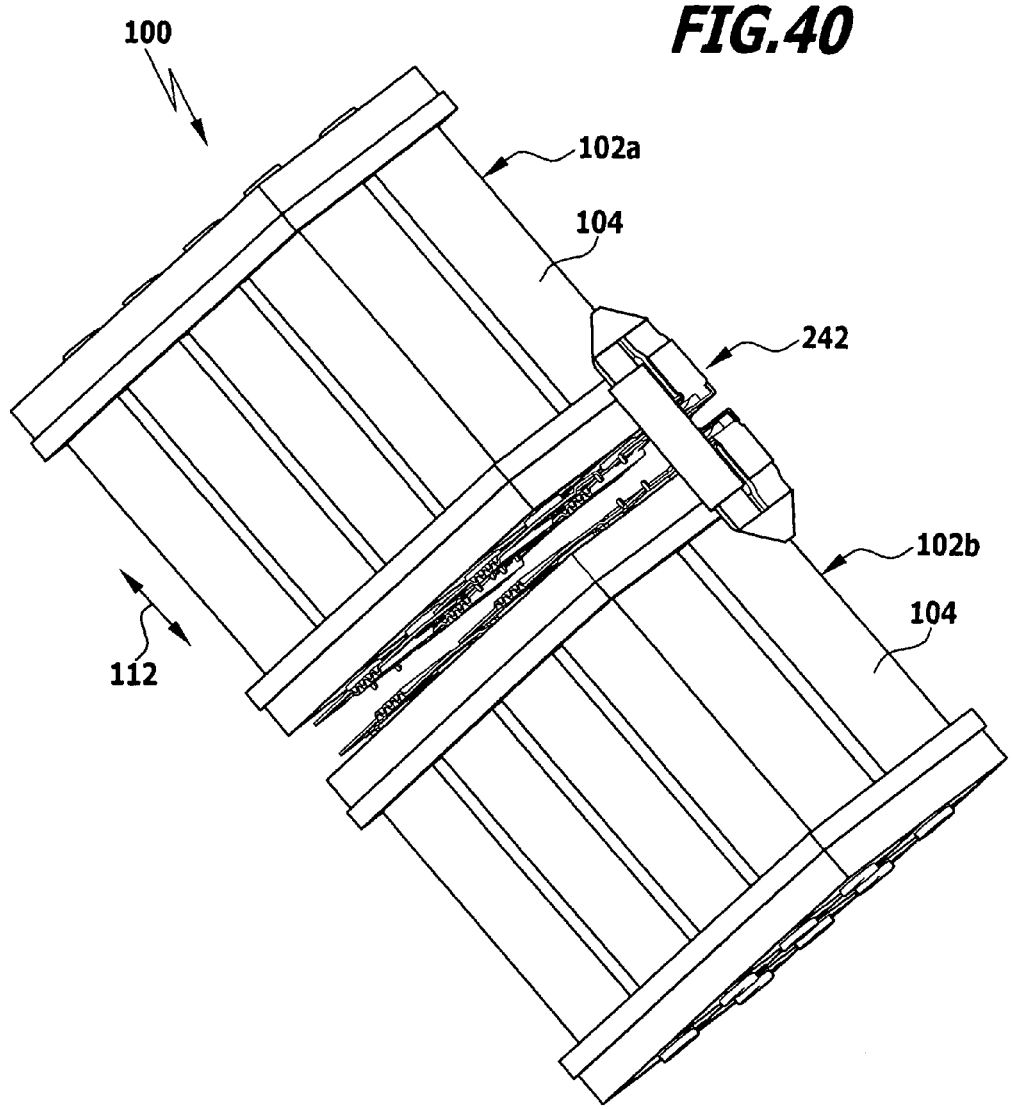
FIG. 40 is a schematic perspective representation of two modules of the electrochemical device, wherein an electrical connection of a first module is connected to an electrical connection of a second module by means of a module connector.
Figure 41:
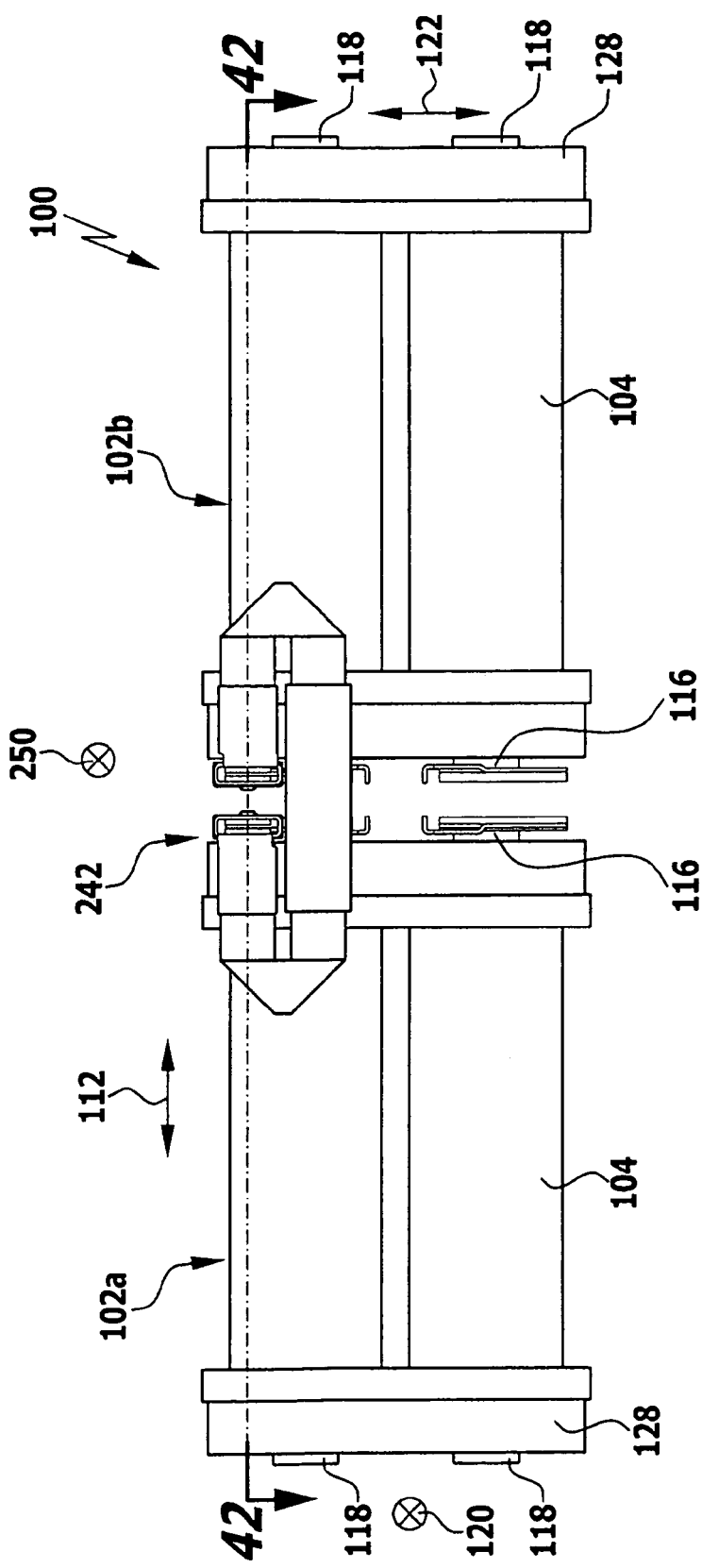
FIG. 41 is a schematic side view of the two modules with the module connector from FIG. 40 with a view onto a narrow side of the modules.
Figure 42:
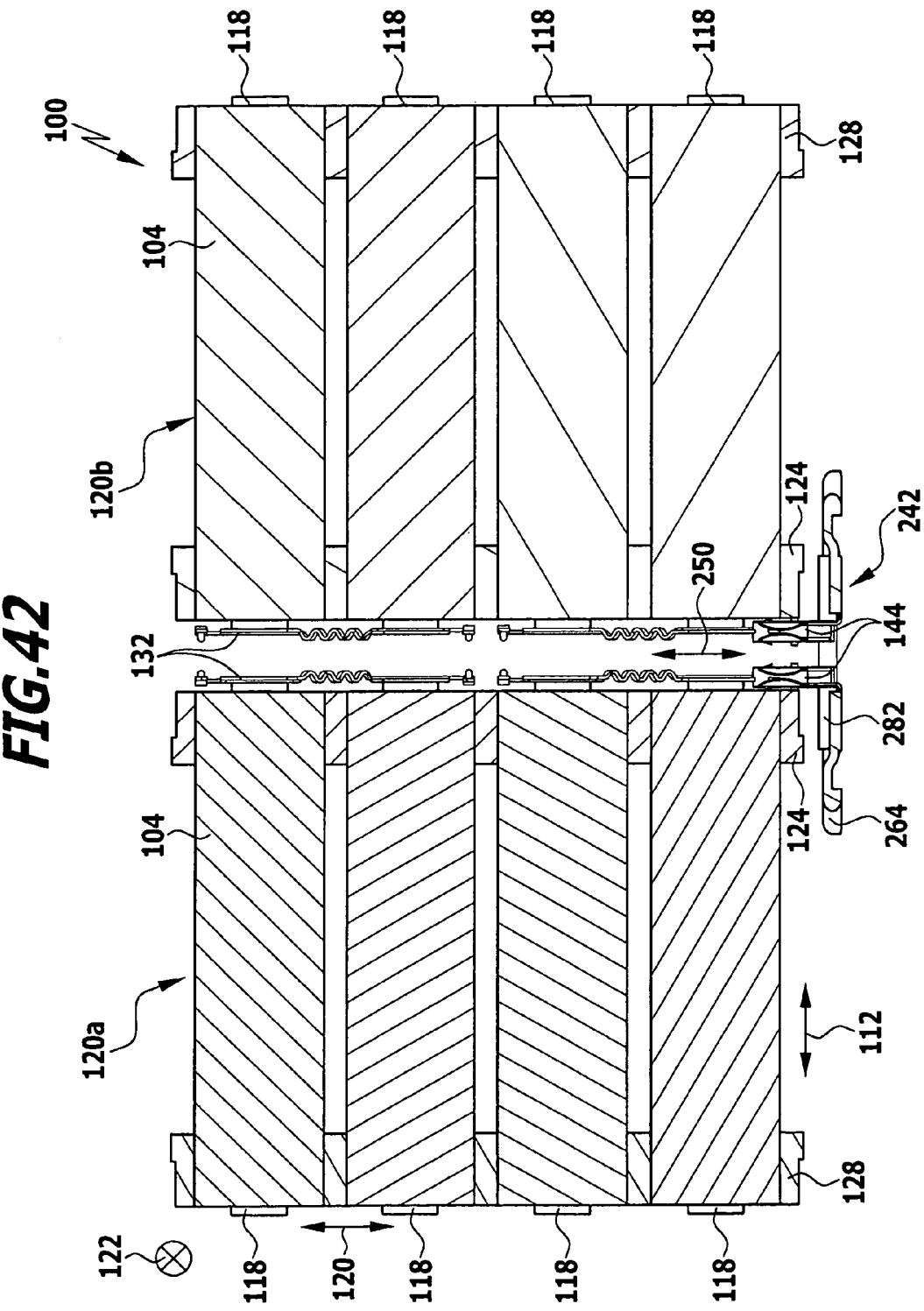
FIG. 42 is a schematic view in longitudinal section through the two modules and the module connector from FIG. 41 along the line 42-42 in FIG. 41.
Figure 43:
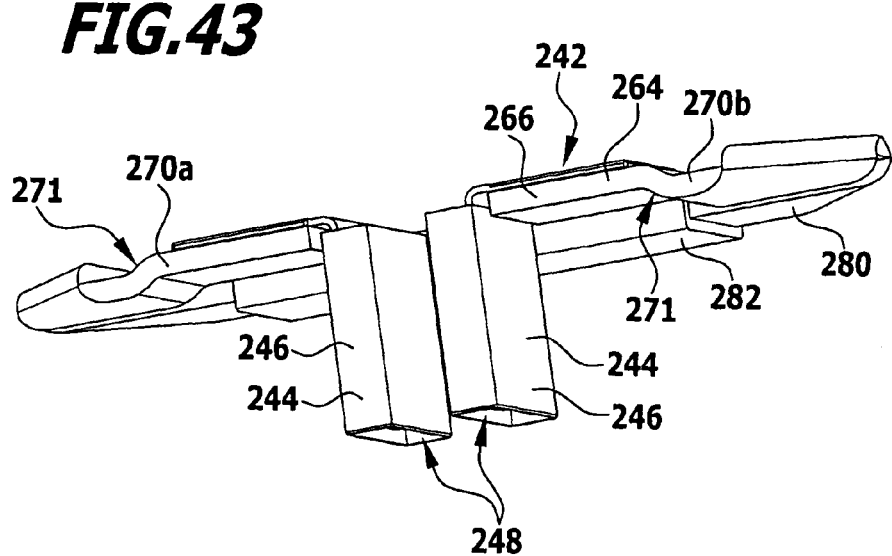
FIG. 43 is a schematic perspective representation of the module connector from FIGS. 40 to 42 viewed from the side facing the electrical connections of the modules.
Figure 44:
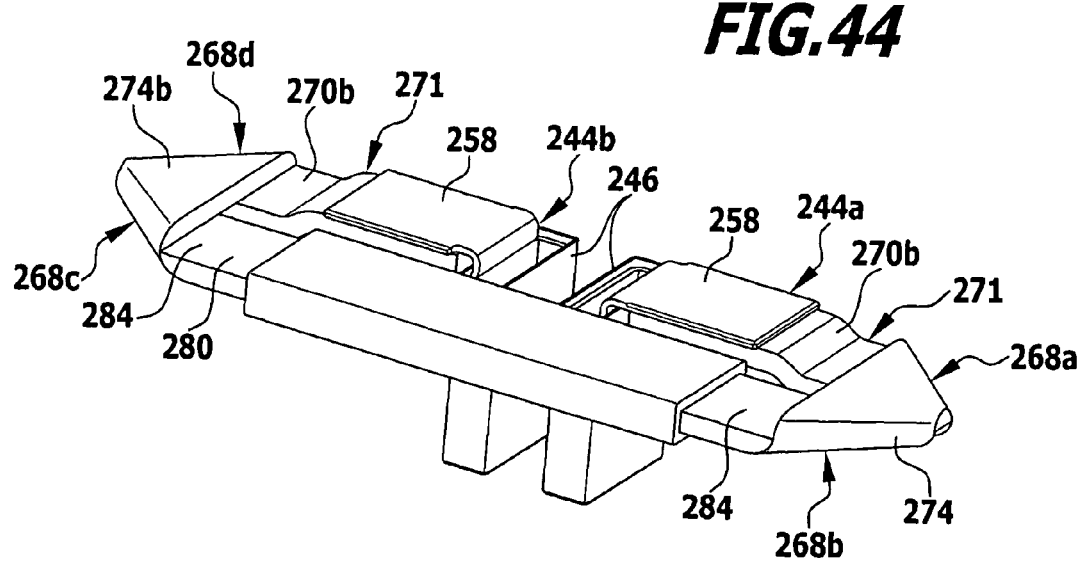
FIG. 44 is a schematic perspective representation of the module connector from FIGS. 40 to 42 viewed from the side remote from the electrical connections of the modules.

Such a series connection can be produced in particular by connecting an electrical connection 138 of a first electrochemical module 102a electrically conductively by means of a module connector 242 to an electrical connection 138 (of opposite polarity) of a second electrochemical module 102b, as is shown in FIGS. 40 to 42.

Details of the module connector 242 are evident from FIGS. 43 to 46, in which the module connector 242 is shown separately.

The module connector 242 comprises two plug units 244 for connecting the module connector 242 to the electrical connections 138 of the electrochemical modules 102a and 102b to be connected to one another, wherein the plug units 244 respectively comprise an eg. approximately cuboidal plug housing 246, which is formed from a metallic material, for example, in particular from a special steel material.

Each plug housing 246 encloses a seating 248, which extends in a connection direction 250 of the module connector 242 and into which a plug section 144 of a contact element 140 of the electrical connection 138 of an electrochemical module 102 is respectively insertable.

Figure 46:
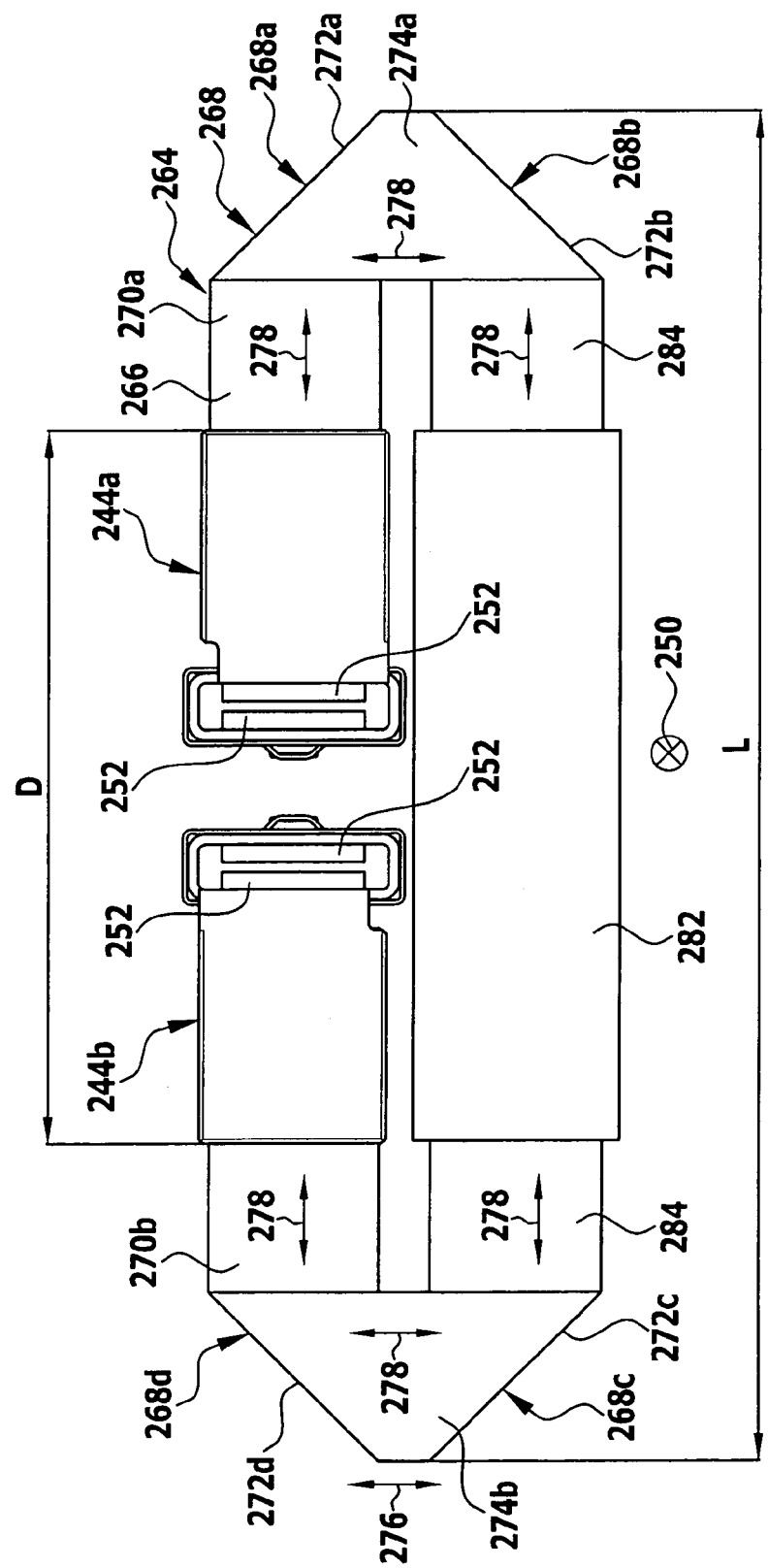
FIG. 46 is a schematic plan view onto the module connector from FIGS. 43 to 45 with a view onto the side of the module connector remote from the electrical connections of the modules.

As may be seen from FIG. 46, two opposing contact studs 252 are additionally arranged in the seating 248, between which studs the respective plug section 144 is clamped with elastic bias when the module connector 242 is arranged on the respective electrochemical module 102.

In addition, each plug housing 246 is provided on its outer surface with catch elements 254 for locking the plug housing 246 to an electrical insulation body (not shown) and with projections 256, which can serve as guide element and/or as stop when connecting the respective plug housing 246 to the respective insulation body.

The contact studs 252 of each plug unit 244 are connected electrically conductively to an angled connection lug 258, which projects out of the end of the plug housing 246 remote from the module 102 to be connected, the free legs 160 of said lug extending away from the respective plug housing 246 in a longitudinal direction 262 of the module connector 242 running transversely, preferably substantially perpendicularly, to the connection direction 250.

In this case, the free legs 260 of the connection lugs 258 of the two plug units 244 are directed in opposing directions in this longitudinal direction 262.

The connection lugs 258 of the two plug units 244 are electrically conductively connected to one another by a flexible conductor 264, which is formed, preferably in one piece, from a woven fabric tape 266 comprising electrically conductive wires, in particular from a flat stranded wire, and has a plurality of, e.g. four, folds 268.

The electrically conductive wires of the fabric tape 266 are preferably formed from copper as electrically conductive component.

A first end section 270a of the conductor 264 is fixed on a side of the connection lug 258 of the first plug unit 244a facing the electrochemical module 102 to be connected in the connected state of the module connector 242, e.g. by welding, in particular by ultrasonic welding.

The first end section 270a extends away from the connection lug 258 of the first plug unit 244a in the longitudinal direction 262 of the module connector 242, i.e. in the direction remote from the second plug unit 244b, and can be provided with a bend 271, by means of which the part of the first end section 270a remote from the first plug unit 244a is displaced towards the module 102 to be connected in the connection direction 250.

At a first fold line 272a, which runs on a slope, preferably at an angle of approximately 45°, to the longitudinal direction 262 of the module connector 242 and to the local longitudinal direction of the fabric tape 266 in the first end section 270a, the end of the first end section 270a remote from the connection lug 258 merges into an approximately trapezoidal first connection section 274a, in which the local longitudinal direction of the conductor 264 runs parallel to the transverse direction 276 of the module connector, which is oriented perpendicularly to the longitudinal direction 262 and perpendicularly to the connection direction 250 of the module connector 242.

In this case, the fold 268a at the first fold line 272a preferably occurs so that the first connection section 274a is arranged on the side of the end section 270a remote from the modules 102 to be connected.

By means of a fold 268b at a second fold line 272b, which runs inclined, preferably at an angle of approximately 45°, to the transverse direction 276 of the module connector 242 and to the local longitudinal direction 278 of the conductor 264 in the first connection section 274a, the first connection section 274a merges into a compensating section 280, which extends parallel to the longitudinal direction of the module connector 242 laterally past the plug units 244a and 244b, wherein the compensating section 280 is displaced in the transverse direction 276 of the module connector 242 relative to the plug units 244a, 244b and relative to the first end section 270a of the conductor 264.

The compensating section 280 of the conductor 264 can be provided with an electrically insulating sheath 282, which can be formed, for example, from an elastomeric plastic material, in particular from a PVC material.

The broad sides 284, 284' of the band-like compensating section 280 of the conductor 264 are oriented substantially perpendicularly to the connection direction 250 of the module connector 242.

By means of a fold 268c at a third fold line 272c, which runs inclined, preferably at an angle of approximately 45°, to the longitudinal direction 262 of the module connector 242 and to the local longitudinal direction 278 of the conductor 264 in the compensating section 280, the compensating section 280 merges at its end remote from the first connection section 274a into a second connection section 274b, which is substantially trapezoidal and starting from the compensating section 280, extends in the transverse direction 276 of the module connector 242 towards the side of the compensating section 280, on which the plug units 244a and 244b are arranged.

In this case, folding at the second fold line 272b and at the third fold line 272c occurs in such a manner that the compensating section 280 is arranged on the side of the first connection section 274a and the second connection section 274b facing the modules 102a, 102b to be connected.

Figure 45:
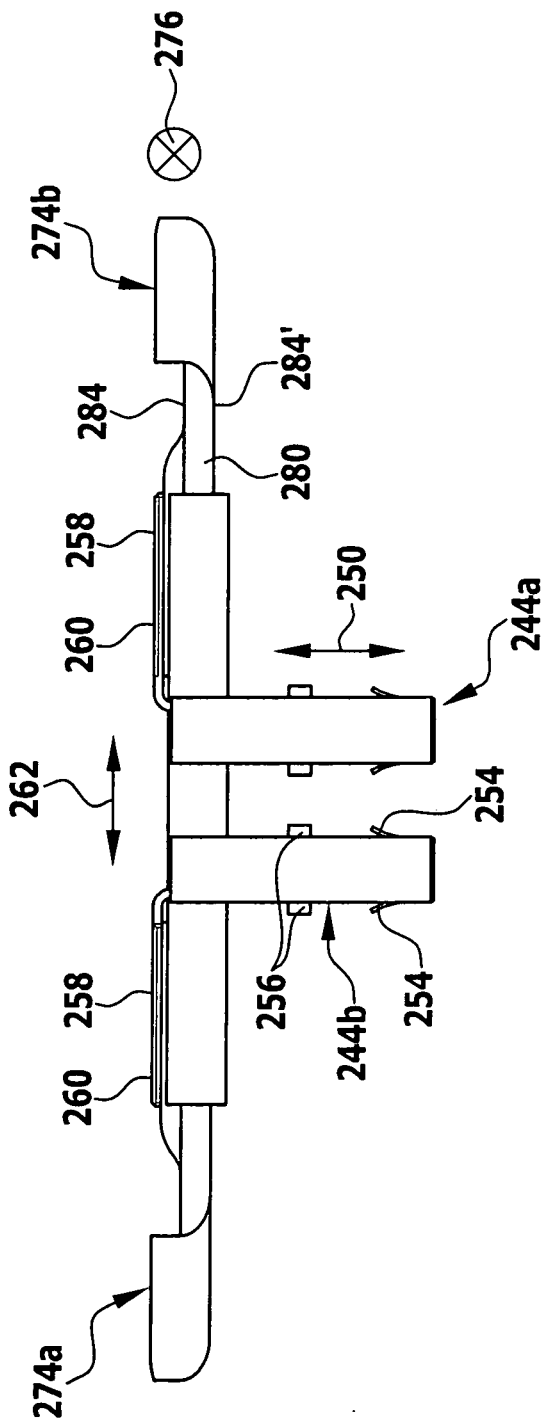
FIG. 45 is a schematic side view of the module connector from FIGS. 43 and 44.

Consequently, as may be seen in particular from FIG. 45, the compensating section 280 does not project in the connection direction 250 beyond the side of the plug units 244 remote from the modules 102a, 102b to be connected, and therefore the module connector 242 has a particularly small extent in the connection direction.

By means of a fold 268d at a fourth fold line 272d, which runs inclined, preferably at an angle of approximately 45°, to the transverse direction 276 of the module connector 242 and to the local longitudinal direction 278 of the conductor 264 in the second connection section 274b, the second connection section 274b merges into a second end section 270b, which extends from the second connection section 274b to the connection lug 258 of the second plug unit 244b and is fixed on the side of this connection lug 258 facing the modules 102a, 102b to be connected, e.g. by welding, in particular by ultrasonic welding.

The second end section 270b can also be provided with a bend 271, by means of which the part of the second end section 270b remote from the second plug unit 244b is displaced in the connection direction 250 towards the module 102 to be connected.

In this case, folding along the fourth fold line 272d occurs in such a manner that the second end section 270b of the conductor 264 is arranged on the side of the second connection section 274b facing the modules 102a, 102b to be connected.

As may be seen in particular from FIG. 46, the compensating section 280 of the conductor 264 has a length L in the longitudinal direction 262 of the module connector 242, which is greater than the spacing D of the ends of the connection lugs 258 of the plug units 244a, 244b facing away from one another.

As a result of this large space available for compensation of tolerances and as a result of the flexibility of the geometric structure of the conductor 264 increased because of the folds 268, the described module connector 242 enables the relative positions of the plug units 244a and 244b to one another to be changed in a particularly simple way, so that deviations in the relative position of the plug sections 144 to be inserted into the plug units 244a, 244b of the electrical connections 138 of the electrochemical modules 102a, 102b generated by manufacturing tolerances or by changes during operation of the electrochemical device 100 can be compensated particularly simply and effectively.

The invention claimed is:

1. Electrochemical device comprising at least a first electrochemical cell with a first cell terminal, a second electrochemical cell with a second cell terminal and a cell connector connecting the first cell terminal and the second cell terminal electrically conductively to one another,
wherein the cell connector comprises a first contact section for connection to the first cell terminal, a second contact section for connection to the second cell terminal and a deformable compensation region, which is disposed between and connects the first contact section and the second contact section to one another and which is more elastically and/or plastically deformable than the first contact section and the second contact section to allow a movement of the first contact section and second contact section relative to one another, wherein the electrochemical device comprises a receiving device for receiving the first electrochemical cell and the second electrochemical cell, wherein the receiving device is configured as a cooling body surrounding the first electrochemical cell and the second electrochemical cell and is formed from a first material consisting of a metal or alloy that has a first coefficient of thermal expansion, and
wherein the cell connector comprises a base body, which is formed from a second material that has a second coefficient of thermal expansion, which differs by less than 10% from the first coefficient of thermal expansion of the first material.

2. Electrochemical device according to claim 1, wherein the electrochemical device is configured as an accumulator.

3. Electrochemical device according to claim 1 wherein the deformable compensation region includes a profiling different from that of the first contact section and that of the second contact section to render the deformable compensation region more elastically and/or plastically deformable .than the first contact section and the second contact section.

4. Electrochemical device according to claim 1 wherein the deformable compensation region comprises a material having a mechanical property that renders the deformable compensation region more elastically and/or plastically deformable than the first contact section and the second contact section.

5. Electrochemical device according to claim 1 wherein the first material and the second material are substantially the same.

6. Electrochemical device according to claim 1 wherein the first material and the second material are aluminum or an aluminum alloy.

* * * * *